(12) United States Patent
Neskovic et al.

(10) Patent No.: US 6,560,360 B1
(45) Date of Patent: May 6, 2003

(54) FEED FORWARD FEED BACK MULTIPLE NEURAL NETWORK WITH CONTEXT DRIVEN RECOGNITION

(75) Inventors: Predrag Neskovic, Providence, RI (US); Douglas L. Reilly, Narragansett, RI (US); Leon N Cooper, Providence, RI (US)

(73) Assignees: Nestor, Inc., Providence, RI (US); Brown University Research Foundation, Providence, RI (US)

( * ) Notice: Subject to any disclaimer, the term of this patent is extended or adjusted under 35 U.S.C. 154(b) by 0 days.

(21) Appl. No.: 09/491,968

(22) Filed: Jan. 27, 2000

Related U.S. Application Data
(60) Provisional application No. 60/117,613, filed on Jan. 28, 1999.

(51) Int. Cl.[7] .............................. G06K 9/00; G06K 9/72
(52) U.S. Cl. ...................... 382/181; 382/230; 382/229
(58) Field of Search .................................... 382/229, 228, 382/230, 100, 181

(56) References Cited

U.S. PATENT DOCUMENTS 4,326,259 A  *  4/1982  Cooper et al. ............. 708/212
5,261,009 A  *  11/1993 Bokser ....................... 382/230
5,500,905 A  *  3/1996  Martin et al. ............... 382/157

* cited by examiner

*Primary Examiner*—Leo Boudreau
*Assistant Examiner*—Hussein Akhavannik
(74) *Attorney, Agent, or Firm*—Weingarten, Schurgin, Gagnebin & Lebovici LLP

(57) ABSTRACT

A recognition system is disclosed, including a representation of an object in terms of its constituent parts that is translationally invariant, and which provides scale invariant recognition. The system further provides effective recognition of patterns that are partially present in the input signal, or that are partially occluded, and also provides an effective representation for sequences within the input signal. The system utilizes dynamically determined, context based expectations, for identifying individual features/parts of an object to be recognized. The system is computationally efficient, and capable of highly parallel implementation, and further includes a mechanism for improving the preprocessing of individual sections of an input pattern, either by applying one or more preprocessors selected from a set of several preprocessors, or by changing the parameters within a single preprocessor.

13 Claims, 19 Drawing Sheets

FEED FORWARD FEED BACK MULTIPLE NEURAL NETWORK WITH CONTEXT DRIVEN RECOGNITION

CROSS REFERENCE TO RELATED APPLICATIONS

This application claims priority under 35 U.S.C. §119(e) to provisional patent application Ser. No. 60/117,613 filed Jan. 28, 1999.

STATEMENT REGARDING FEDERALLY SPONSORED RESEARCH OR DEVELOPMENT

The development of this invention was supported at least in part by the United States Office of Naval Research in connection with grant number N0014-91-J1316. Accordingly, the United States Government may have certain rights in the invention.

BACKGROUND OF THE INVENTION

The present invention relates generally to automated recognition systems for classifying and identifying patterns as objects within a library of objects, and more specifically to a recognition system including feed forward, feed back multiple neural networks with context driven recognition.

As it is generally known, preprocessing forms an integral part of many existing artificial recognition systems. In such systems, preprocessing converts or transforms an input signal into a more suitable form for further processing. Some common steps performed by existing recognition systems during preprocessing of an input signal include normalization, noise reduction (filtering), and feature extraction. There are various reasons for using preprocessing, including the fact that input signals often contain noise, and that preprocessing can sometimes effectively eliminate irrelevant information. Furthermore, performing data reduction during preprocessing may result in at least two advantages for neural network based recognition systems: a) dimensionality of the input vectors is reduced, affording better generalization properties, and b) training is generally much simpler and faster when smaller data sets are used. However, obtaining these advantages by preprocessing in some cases may introduce certain potential problems, since preprocessing may sometimes result in the loss of important information from the input signal.

For example, a standard procedure for noise removal in two-dimensional images is generally known as "smoothing" of the input signal. One of the simplest ways to smooth an image includes convolving it with a mask of a fixed size and setting the value of every pixel within the mask to the average value of the pixels within the mask. The smoothing process can be controlled by a set of parameters, one of which is the size of the mask. The size of the mask may vary from one pixel (when there is no smoothing) to the size of the whole image. Varying the value of this mask size parameter from low to high results in changing the resolution of the image from sharp to very blurry. It is, however, very difficult to correctly determine the value of the mask size parameter prior to recognition. This is because image recognition may be impaired if the resulting image resolution is too poor. For example, in the case of handwriting recognition, omission of a noise-like structure, such as a dot above "i" or "j", due to poor image resolution, could impair recognition.

One reason why some of the problems encountered at the preprocessing level are not possible to resolve during preprocessing is that some information which is necessary for choosing optimal preprocessing parameters is not yet available. Accordingly, it would be desirable to have a recognition system that provides interaction between higher (cognitive) level processing and the preprocessor in order to change the parameters controlling the preprocessor according to dynamically determined, higher level expectations.

U.S. Pat. No. 4,760,604 of Cooper et al. discloses a recognition system that may use multiple preprocessors. In that system, each of a number of adaptive modules can facilitate a different preprocessing scheme, but the preprocessing is done "globally" on the whole input pattern. It would be desirable, however, to use feedback information for a) locating a section or portion of the input pattern that needs additional preprocessing, and b) changing the preprocessing of only such a section or portion. This would be especially useful during recognition of complex objects where a specific type of "re-preprocessing" appropriate for one section could improve recognition of that particular section, but may have an adverse effect on recognition of the rest of the object if applied globally. Moreover, in order to selectively apply different preprocessing techniques to different regions of an object, a recognition system should be able to appropriately segment an object into parts. It would be desirable, therefore, to have a system which provides an appropriate, segmented representation of an object for the purpose of applying different preprocessing techniques at different regions of the object.

An effective recognition system should further be capable of recognizing a pattern regardless of its position and/or size within the overall context in which it is received. For example, the position of an address written on an envelope or a package can vary significantly, and the sizes of individual letters and numbers within the address are also not fixed. In many existing recognition systems, this problem is addressed at the preprocessing stage. In such existing systems, prior to a recognition stage, the received image is "cleaned", in that the text is located, and surrounded by a rectangle that is then re-scaled or normalized. However, this approach suffers from significant drawbacks since at the level of preprocessing it is not yet known which sections of the input signal represent text or speech, and which sections represent background. Therefore, the output of such existing systems often consists of numerous false segmentations. It would be desirable to have a recognition system that does not rely on (prior to recognition) pre-segmentation of the input signal.

In addition, it would be desirable to provide a translationally invariant representation of an input object, within a system which also provides scale invariant recognition. The translationally invariant representation would permit an object to be described with the same values regardless of its position or location within the input signal. Such scale invariant recognition would allow recognition of an object that may appear in different scales or sizes, while the system need only be trained on one scale.

Another challenging problem in the field of pattern recognition is the identification and classification of objects that are only partially present within the input signal, or that are partially occluded for some reason. It would further be desirable to provide a recognition system that allows for the recognition of incomplete or partially occluded patterns as parts of a recognizable object.

One of the problems in the field of sequence analysis, as occurs in speech or cursive writing recognition systems, is referred to as the segmentation/binding dilemma. This problem stems from the fact that in order to unambiguously segment an input word into letters, the input word must be known, but in order to recognize the word, its constituent letters must be known. An existing approach to solving this problem (e.g. in cursive recognition applications), is to first make all possible segmentations, and then to choose an "optimal" one, with respect to the set of potentially recognizable objects, according to some predetermined criterion or cost function. Since this method is often computationally intensive, it is desirable to use an algorithm that can efficiently search the space of potentially recognizable objects. To this end, researchers have often used some variation of conventional dynamic programming optimization techniques. However, in some cases, dynamic programming techniques do not decrease the computational complexity of selecting an optimal segmentation. Accordingly, it would be desirable to have a method for recognizing an object which permits features of the object to be individually recognized and associated with the object, based on context information of some kind. Such a method should advantageously lend itself to a high degree of parallelism in its implementation, thus resulting in fast recognition results obtained in relatively few cycles. Such a method could, in some cases, advantageously provide an alternative to the dynamic programming based post-processing employed in existing systems to find an optimal segmentation of an input pattern.

Another problem related to sequence analysis in recognition systems is selecting a convenient representation of an input pattern that captures the sequential nature of the input signal. One technique used in existing recognition systems is based on what are generally referred to as "Hidden Markov Model" (HMM) algorithms. Although HMM algorithms have many useful properties, they only provide a global characterization of the input pattern. For example, in a handwriting recognition system, an HMM algorithm might provide only a global characterization of the input pattern equal to the probability that the complete pattern represents a certain dictionary word. However, such global characterizations are sometimes limited, and it would be desirable, therefore, to provide and employ descriptions of the input pattern other than a global characterization of the pattern during the recognition process. Moreover, systems based on HMM algorithms are generally not easily extensible to the analysis of two-dimensional signals. It would therefore be desirable to have a recognition system that, in contrast, can be easily extended to analysis of two-dimensional signals, as in image recognition such as face recognition and/or vehicle identification applications.

In summary, and in view of the various deficiencies and shortcomings of existing systems, it would be desirable to have a recognition system which provides a representation of an object in terms of its constituent parts, provides a translationally invariant representation of the object, and which provides scale invariant recognition. The system should further provide effective recognition of some patterns that are partially present in the input signal, or that are partially occluded, and also provide a suitable representation for sequences within the input signal, such that sequential ordering is preserved. Additionally, the system should provide a procedure/algorithm, based on dynamically determined, context based expectations, for identifying individual features/parts of an object to be. recognized. The system should be computationally efficient, and capable of implementation in a highly parallelized embodiment, while providing an information processing system that utilizes the interaction between a higher (cognitive) processing level and various lower level modules. Furthermore, it would be desirable to provide a mechanism for improving the preprocessing of individual sections of an input pattern, either by applying one or more preprocessors selected from a set of several preprocessors, or by changing the parameters within a single preprocessor.

BRIEF SUMMARY OF THE INVENTION

In accordance with the present invention, a recognition system is disclosed which may be applied to recognition of a variety of input signals, including handwriting, speech, and/or visual data. While the disclosed system is generally suitable for the recognition of one-dimensional sequences, such as speech or cursive writing, it is not restricted to one-dimensional problems and is also applicable to two dimensional image analyses, including face recognition and/or vehicle identification systems.

With reference to the disclosed system, the first stage of the recognition process is referred to as preprocessing. The preprocessing stage performs appropriate preprocessing functions, for example normalizing and filtering an input signal, $S=(s_1, s_2, \ldots, s_M)$, and transforms the input signal into a feature vector, $F=(f_1, f_2, \ldots, f_R)$. The feature vector is then presented to a number of detection units. The detection units detect parts of a number of potentially recognizable objects within the input signal. Recognizable objects may be, for example, words, faces, or vehicles, individual ones of which may be identified by their respective features. For example, in a handwriting recognition embodiment of the disclosed system, each detected part of a recognizable word may correspond to a "letter", and each detection unit may be referred to as a "letter detector", operating on a section of the feature vector corresponding to a letter from a predetermined alphabet. Detection units are positioned over the feature vector, $F=(f_1, f_2, \ldots, f_R)$, so as to completely cover it, such that each feature in the feature vector is processed by at least one detection unit. Adjacent detection units may, in some circumstances, have overlapping receptive fields. In an illustrative handwriting recognition embodiment of the disclosed system, in which the number of letters in the alphabet is K, there are K detection units, each for detecting a different letter, which receive their input from the same section of the feature vector. As a result, each section of the feature vector can have K different interpretations depending on the activation levels of the detection units positioned over it. A structure reflecting the complete set of letter detector outputs across the complete feature vector is referred to as the detection matrix. Each element of the detection matrix reflects an activation level of a detection unit for one letter in the alphabet, at a particular location within the feature vector. An activation level for a particular letter is a value representing the probability that the letter has been detected. Accordingly, each detection matrix element contains a value indicating the probability that a particular letter from the alphabet has been detected at particular location within the feature vector. The process of transforming the feature vector into the detection matrix by the detection units is referred to as segmentation, and accordingly the set of detection units form at least a part of what is referred to as the segmentation network.

Following segmentation, the next stage of the recognition process is referred to as postprocessing. Postprocessing includes selecting a set of letters from the detection matrix, such that, according to some predetermined criteria or cost function, the selected set of letters represents a word from a predetermined word set, sometimes referred to as a "dictionary". This selection of letters representing a dictionary word is also referred to as "binding" the letters to the word.

The remainder of the components in the disclosed system, including what are referred to as simple units, complex units, word units, the decision module and the selective attention module are referred to as the binding network, and are employed as part of the postprocessing stage of the recognition process.

The relative position of the various units in the binding network, with respect to the position of the detection units of the segmentation network, is adjustable. This relative positioning may be adjusted in various ways, including the following two approaches: either the binding network is kept fixed and the position of the detection units in the segmentation network is changed by the selective attention module, or the position of the detection units in the segmentation network is fixed and the position of the binding network is changed. In the illustrative embodiments disclosed herein the segmentation network is fixed and the position of the binding network is changed, however the invention is not limited to such an implementation, and may alternatively be embodied with the binding network in a fixed position and providing adjustment of the relative position of the segmentation network.

The binding network of the disclosed system selects a subset of the detection matrix elements corresponding to letters of a recognizable word in the dictionary. The number of detection matrix elements selected by the binding network is advantageously equal to the number of letters in the recognizable dictionary word, not to the number of columns of the detection matrix, in contrast to some existing systems, such as those employing HMM algorithms. For example, in the case where an input pattern represents the word "cat", many elements of the detection matrix may have high activation values, such as the elements representing the letters "c, a, t", and elements representing visually similar letters such as "o, l, e, n, u, i." In this example, the goal of the binding network is to select only three elements from the detection matrix, namely those representing the letters "c", "a" and "t", and to discard or suppress all other elements from the detection matrix.

In the beginning of the disclosed binding procedure, an element from the detection matrix, for example one with the highest activation value, is selected as the "central letter". The location of the selected central letter within the detection matrix determines a view of the input pattern to be employed by the recognition system. One or more words from the dictionary are then associated with the input pattern. For example, if the letter "c" is selected as the central letter, the words "act", "ice" and "account" might be associated with the input pattern since they all contain the letter "c". The dictionary word that is most strongly associated with the pattern, for example the word "act", reflects high level, contextual expectations regarding the structure of the input pattern in the sense that the context of the word "act" requires that the letter "a" should be found in a certain region to the left of the central letter "c", and the letter "t" should be found in a certain region to the right of the letter "c". Accordingly, instead of trying to find all possible sequences from the detection matrix that represent recognizable objects, the recognition system now advantageously employs an active process of looking for certain letters at certain expected locations. The binding network proposes a "tentative" segmentation of the input pattern, meaning that it selects some elements from the detection matrix that satisfy high level expectations (in terms of their locations) and which are detected with high confidence. We call the letters forming the tentative segmentation the "selected letters". The next step is to verify if the tentative segmentation is correct. For example, if the input pattern represents the word "act", and if the selected central letter is the letter "c", then the tentative segmentation might be "a-c-t", and in this particular case it would be the correct segmentation.

In order to determine whether the tentative segmentation is correct, the binding network then selects an element from the detection matrix as the next central letter, and referred to as the target letter. The target letter is one of the letters from the tentative segmentation, for example the letter "t". The binding network is then repositioned over detection matrix based on the position of the target letter within the detection matrix. One of the goals of repositioning the binding network is to verify whether the previously selected letters, from the tentative segmentation, are at their expected locations. If the selected letters are within expected regions, then the next target letter is selected. Otherwise, if the selected letters are not within expected regions, some of the letters from the tentative segmentation are dismissed as candidates and the binding network generates a new tentative segmentation. The binding process is terminated once the location of every selected letter is determined to be within an expected region with respect to all other selected letters.

In addition to selecting a set of elements from the detection matrix, the disclosed system may selectively modify preprocessing parameters in accordance with feedback reflecting dynamically determined, higher level expectations, such as location or temporal expectations with respect to various components of a recognizable object, such as letters of a recognizable word in a handwriting recognition system. Significantly, these changes to the preprocessing parameter values are performed locally with respect to one or portions of the detection matrix, meaning that the changed values may be used for "re-preprocessing" certain regions of the input pattern. This is useful, and often necessary, during recognition of complex objects where changing the preprocessing of one section of the input pattern improves recognition of that section but has an adverse effect on recognition of the rest of the object.

Further in the disclosed system, in the beginning of the recognition process, default values for various specific recognition threshold parameters, such as an edge presence threshold for an edge detector, are used for preprocessing of the whole input pattern. If there is confusion among top ranked words ("candidate words"), or if the top ranked word is not recognized with acceptable confidence, the decision module initiates the re-preprocessing of one or more sections of the input pattern. Only one word at a time is selected for re- preprocessing. If a location estimate and/or detection estimate of some of the selected letters is below a predetermined detection threshold, the decision module varies the parameters that were used in generating the estimates in question until the best estimate values, for each of the selected letters, is obtained. It is important to note that such parameters are modified in a controlled way, meaning that: a) the values of the parameters are restricted to vary only within certain predetermined, permissible intervals, and b) the parameters are modified until the best possible recognition is achieved for the given input pattern.

The disclosed system may advantageously be embodied within a highly parallel implementation, thus providing relatively fast recognition results. The disclosed system introduces an alternative to dynamic programming based post-processing for finding an optimal segmentation of an input pattern. The disclosed system is a working neural network-based system that employs context information to segment, modify and organize bottom up information in order to achieve accurate recognition results. In addition to providing a global characterization of the input pattern, the disclosed system may also provide one or more local characterizations of the input pattern.

BRIEF DESCRIPTION OF THE SEVERAL VIEWS OF THE DRAWING

The invention will be more fully understood by reference to the following detailed description of the invention in conjunction with the drawings, of which.

DETAILED DESCRIPTION OF THE INVENTION

The disclosure of provisional patent application Ser. No. 60/117,613 filed Jan. 28, 1999 is hereby incorporated by reference.

Figure 1:
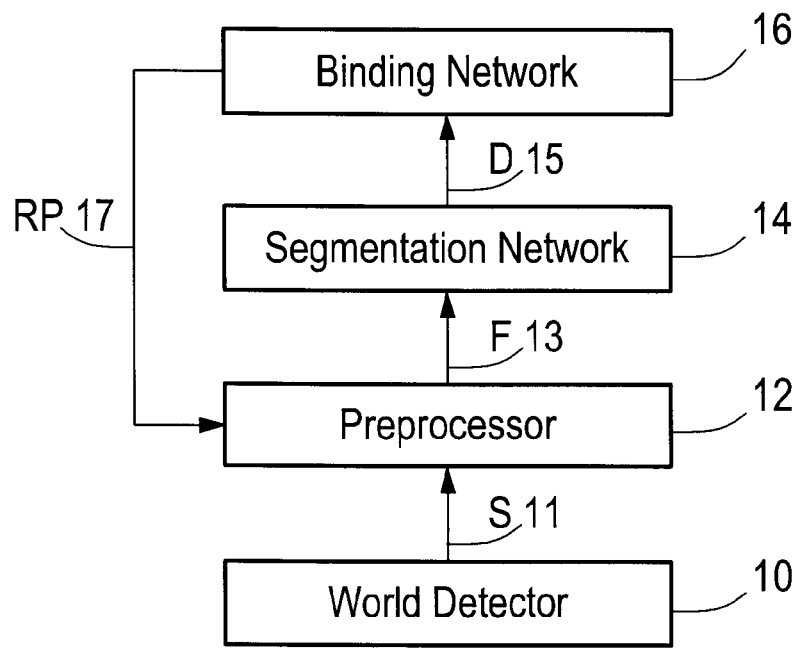
FIG. 1 is a block diagram depicting the flow of information in an illustrative embodiment.

The present invention and its preferred embodiments will now be described with reference to FIGS. 1–20. As illustrated in FIG. 1, the system includes a World Detector 10 which produces a signal vector S 11 comprised of individual scalar component signals, $S=(s_1, s_2, \ldots, s_M)$, representing a pattern or "event" in the outside world. The World Detector 10 may include, or operate in response to, one or more conventional interface devices, as are used to receive various types of input, including handwriting, audio, or video information. For example, in a handwriting recognition system, the World Detector 10 may include an array of light sensors, each of which produces one of the output signals $s_1, s_2, \ldots, s_M$. The elements of FIG. 1 may further include, at least in part, a number of corresponding software modules, each of which may be loaded into one or more memory units or storage devices, for execution using one or more computer processors. Moreover, the disclosed system is capable of being implemented such that some portions of the system shown in FIG. 1 may be embodied using hardware circuits and/or devices, such as one or more Application Specific Integrated Circuits (ASICs), or any other suitable hardware implementation.

A signal vector S 11 in FIG. 1 is presented in parallel to the preprocessor 12 which transforms the signal vector S 11 into a feature vector F 13, where $F=(f_1, f_2, \ldots, f_R)$. The feature vector F 13 is then supplied, in parallel, to the Segmentation Network 14, which segments the feature vector F 13 into a set of "letters". The output D 15 of the Segmentation Network 14 is referred to herein as the "detection matrix", and is supplied to the binding network 16. The binding network 16 selects a subset of the elements from the detection matrix such that the subset represents a dictionary word. The binding network also sends a feedback signal RP 17 to the preprocessor 12. The preprocessor may utilize this feedback signal during a re-preprocessing stage.

Figure 2:
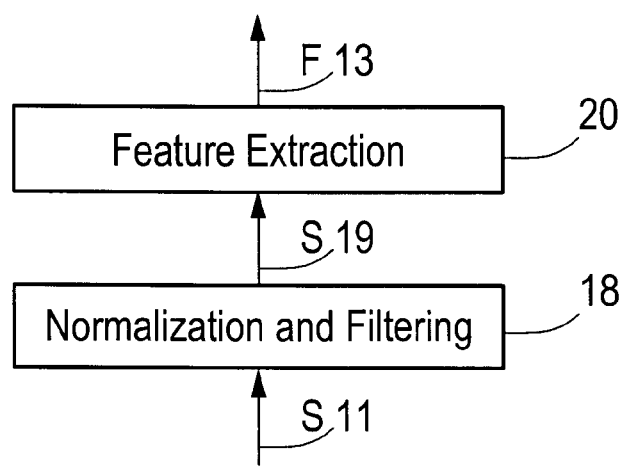
FIG. 2 is a block diagram illustrating operation of a preprocessor.
Figure 3:
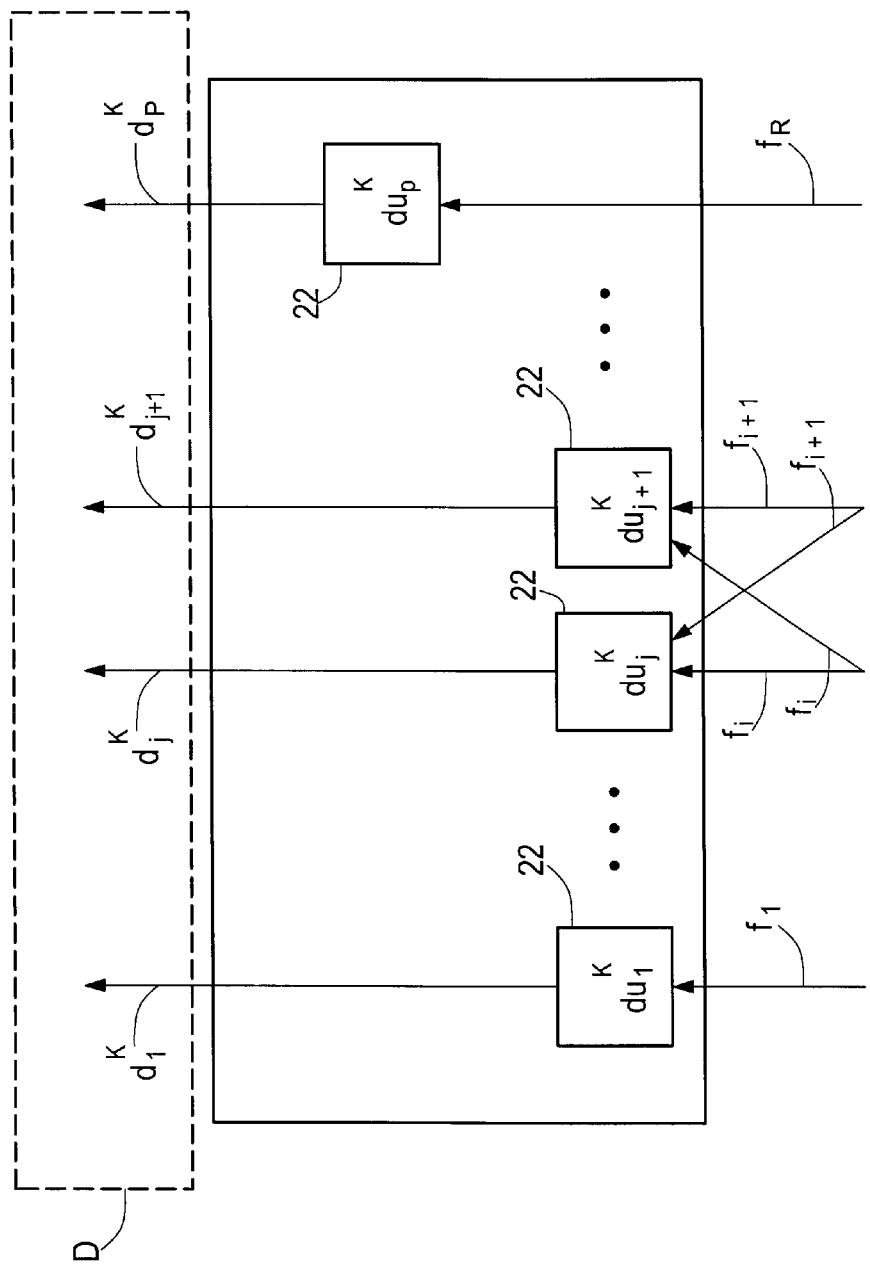
FIG. 3 is a block diagram illustrating the operation of a segmentation network.

A more detailed view of the preprocessor 12 is depicted in FIG. 2. The signal vector S 11 is first subjected to normalization and filtering 18, resulting in transformation of the signal vector S 11 into intermediate vector S' 19. The feature extraction module 20 receives the vector S' and transforms it into the feature vector F 13. The feature vector F 13 is then supplied to the segmentation network 14 that consists of detection units 22, as shown in FIG. 3. A detection unit can, for example, be any system for separation and identification of classes, e.g. a supervised network like the RCE (Reilly, Cooper, Elbaum), or the TDNN (Time Delay Neural Network), or a weight-sharing network, or a back-propagation network, or an unsupervised network based on the BCM (Bienenstock, Cooper, Munro), ICA (Independent Component Analysis), or SOM (Self Organizing Maps) algorithms.

Each of the detection units 22 may also be referred to as a "letter detector", and operates on a section of the feature vector F 13 in order to identify it as a letter within the relevant alphabet. Detection units are positioned over the feature vector F 13 so as to completely cover it, such that all sections of the feature vector are processed by at least one detection unit. Adjacent detection units may have overlapping receptive fields, as is the case with units $du^k_j$ and $du^k_{(j+1)}$ in FIG. 3. In an illustrative embodiment, if the number of letters in the alphabet is K, then there are K detection units, each representing a different letter, that receive their input from each respective section of the feature vector. Each detection unit provides an activation level indicating the probability that the section of the feature vector that it processed represents the letter from the alphabet associated with that detection unit. Accordingly, each section of the feature vector F 13 can have K different interpretations depending on the activation levels of the corresponding detection units positioned over it.

The collection of activation levels from the detection units 22 is referred to as the detection matrix D 15. A symbol $d^k_j$ denotes the probability of detecting a feature, e.g. a letter, of class k at position j (the jth column) within the detection matrix D 15. If the input signal is one dimensional, such as an on-line handwriting or speech signal, then the detection matrix D 15 is two-dimensional. For purposes of illustration, the disclosed embodiments are described with reference to the case where the detection matrix D 15 is two dimensional, though the invention is not limited to such embodiments. A central column is selected within the detection matrix D 15. During the recognition process, different columns of the detection matrix become the central column at different times. The selective attention module determines the location of the central column. The units whose input is coming from the central column are referred to as central units.

Figure 4:
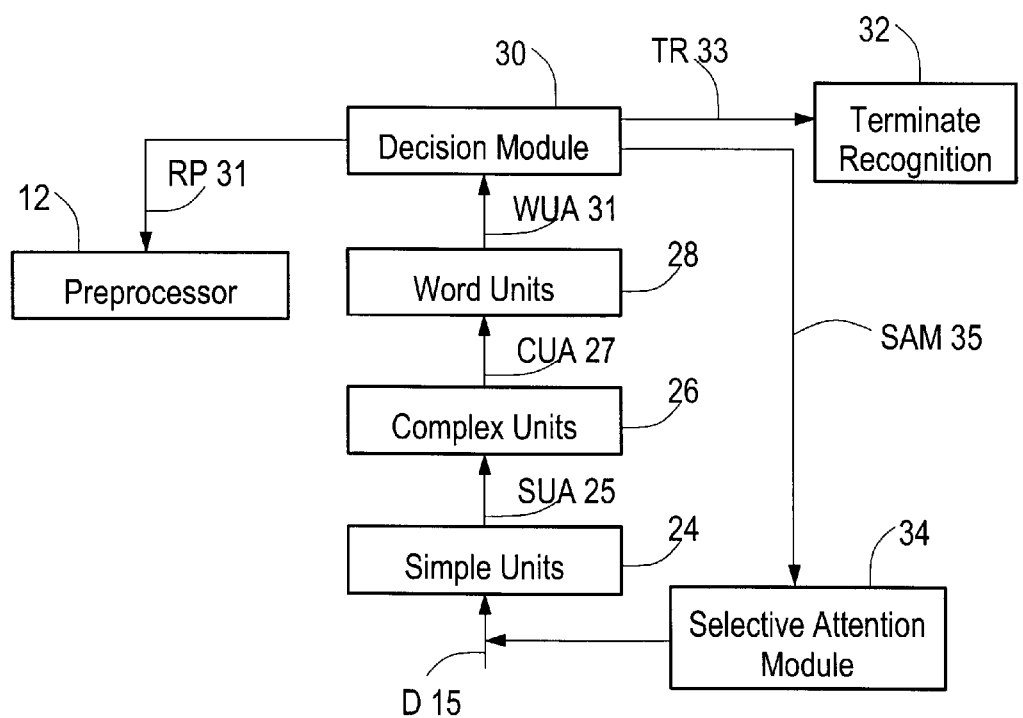
FIG. 4 is a block diagram illustrating the operation of a binding network.

FIG. 4 illustrates functional components corresponding to the binding network 16 shown in FIG. 1. FIG. 4 shows the detection matrix D 15 supplied to a number of simple units 24. The outputs SUA 25 of the simple units 24 are supplied to a number of complex units 26, whose outputs CUA 27 are supplied to a number of word units 28. The decision module 30 receives the outputs WUA 31 of the word units 28. The decision module 30 either sends a feedback signal RP 31 to the Preprocessor 12, terminates the recognition process by sending a terminate recognition signal TR 33 to the terminate recognition module 32, or sends a signal SAM 35 to the Selective Attention Module 34. The Selective Attention Module 34 may reposition the binding network over a new central letter in response to the SAM signal 35.

Word Representation: Word Units, Complex Units and Simple Units

Figure 5:
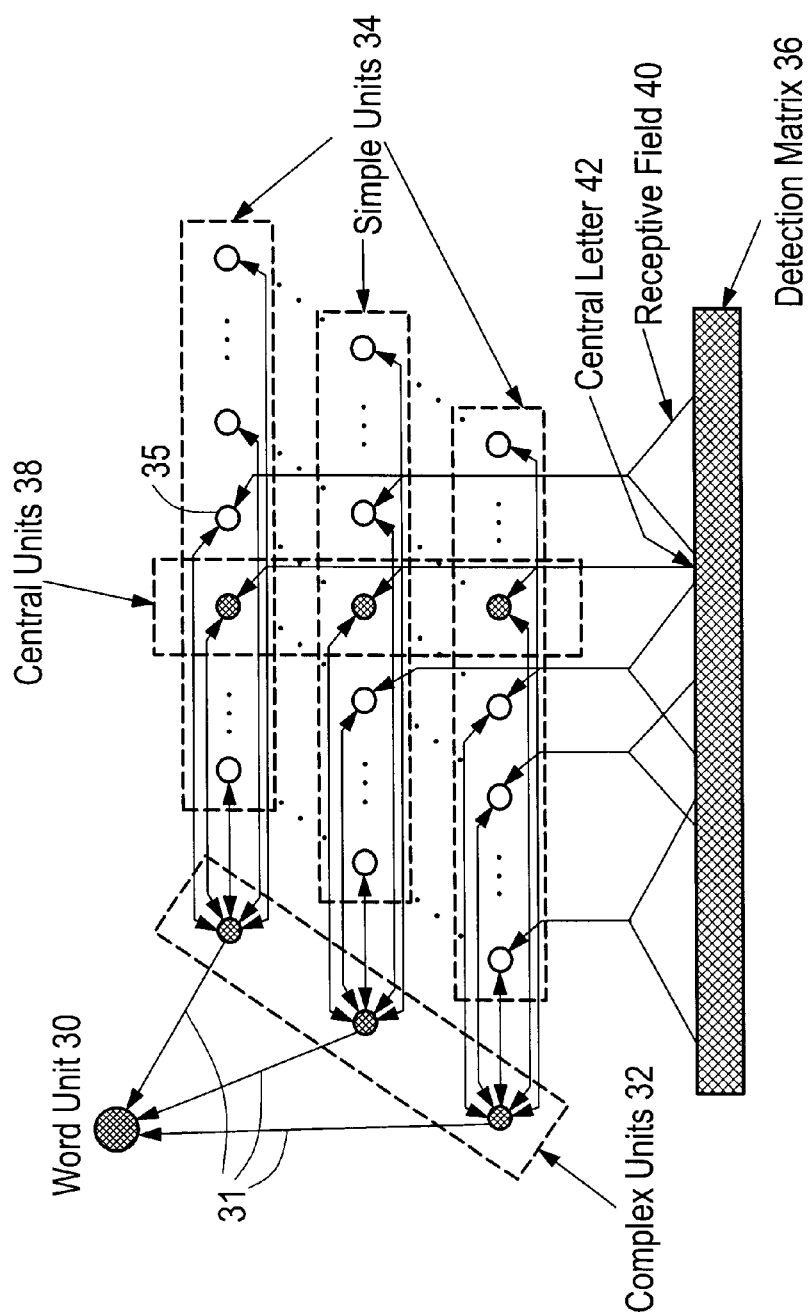
FIG. 5 illustrates connections between various units within a word unit.
Figure 12:
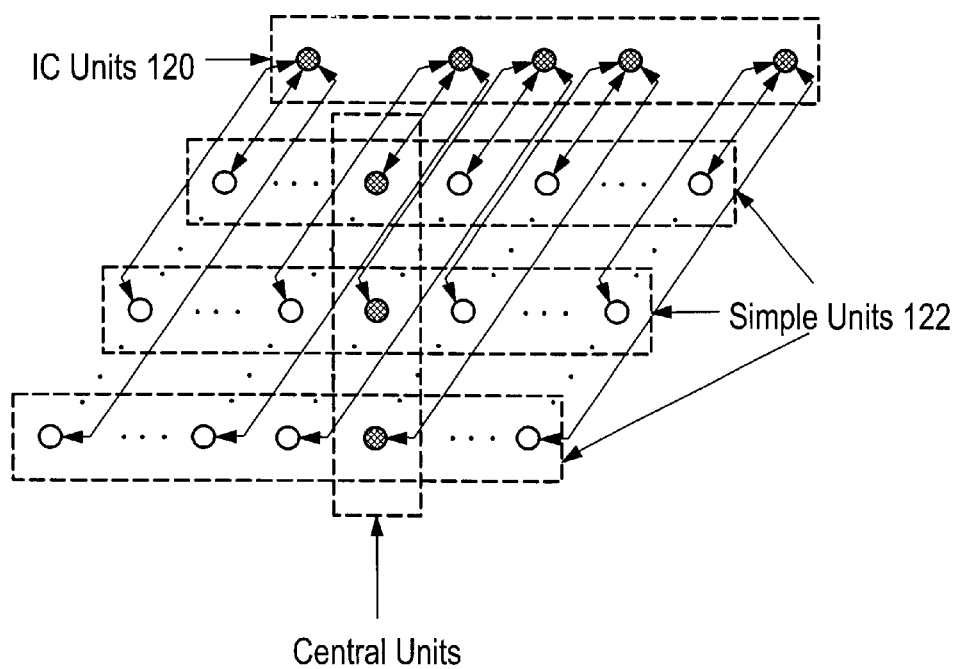
FIG. 12 illustrates connections between an interconnection (IC) unit and simple units of one word unit.

FIGS. 5 and 12 illustrate the structure of a word unit 30. In particular, FIG. 5 illustrates connections between various units associated with a word unit 30, which receives inputs from complex units 32. The weights 31 between the word unit 30 and complex units 32 are, for example, set to one. Accordingly, the operation performed by the word unit 30 is a summation of the activation levels of the complex units 32, in which all activation levels of the complex units 32 are equally weighted. Each of the complex units 32 receives inputs from an associated set of the simple units 34. All the simple units 34 receive inputs from the elements of the detection matrix 36. Each element of the detection matrix 36 represents the activation level of one letter detector, also referred to as a detection unit. Each one of the central units 38 receives its input from the same location in the detection matrix 36.

A recognizable object from a library of recognizable objects is referred to, for purposes of illustration, as a "word". Words consist of "letters" arranged at specific spatial locations. While the terminology used to describe the illustrative embodiment refers to "letters" and "words", as reflects a handwriting recognition embodiment, the present invention is not limited to such an application. For example, in an alternative embodiment for recognition of persons based on visual appearance, for example based on a video input signal, a "word" would correspond to a human face, and the "letters" would be facial features like the nose, the mouth and the eyes, arranged at specific spatial locations with respect to each other. In another alternative embodiment, for recognition of vehicles based on visual appearance, for example based on a video input signal, a "word" would correspond to a vehicle, and the "letters" would be identifying features of that vehicle, such as the hood, windshield, or headlights, arranged at specific spatial locations with respect to each other.

One word unit, such as the word unit 30 shown in FIG. 5, is associated with each recognizable word in the dictionary. For a given input pattern, the activation level of a given word unit is proportional to the probability that the input pattern represents the dictionary word associated with that word unit. Each word unit receives inputs from a number of complex units. Each complex unit is denoted with the symbol $c^{ni}$. The index n numbers the words within the dictionary, and the index i labels complex units within the n-th dictionary word. For example, the symbol $c^{24}$ denotes the fourth complex unit of the word unit representing the second dictionary word. The activation level of the n-th dictionary word unit, $e^n$, as a function of activation levels of its complex units, as is shown by the following equation:

$$e^n = \sum_{i=1}^{L_n} c^{ni}. \tag{1}$$

The symbol $L_n$, denotes the number of letters in the n-th dictionary word. The number of complex units within a word unit corresponding to a given dictionary word, is equal to the number of letters that the word contains. All the complex units that send activation level outputs to a common word unit are said to "belong to", or be "within" that word unit.

As illustrated in FIG. 5, each of the complex units 32 receives inputs from an associated subset of the simple units 34, whereas each of the simple units 34 receives its input from the detection matrix 36. Each of the simple units 34 is associated with a letter in the alphabet. All of the subset of simple units 34 that send outputs to a common complex unit are said to belong to that complex unit. Among the simple units that send outputs to the same complex unit, one is considered the central unit for the complex unit, as shown by the central units 38. Each of the central units 38 receives input from an element of the detection matrix 36 referred to as the central letter 42, and that is located within what is referred to as the central column of the detection matrix 36. The receptive fields of the simple units 34 vary in size, and the receptive fields of neighboring simple units generally overlap.

Figure 9:
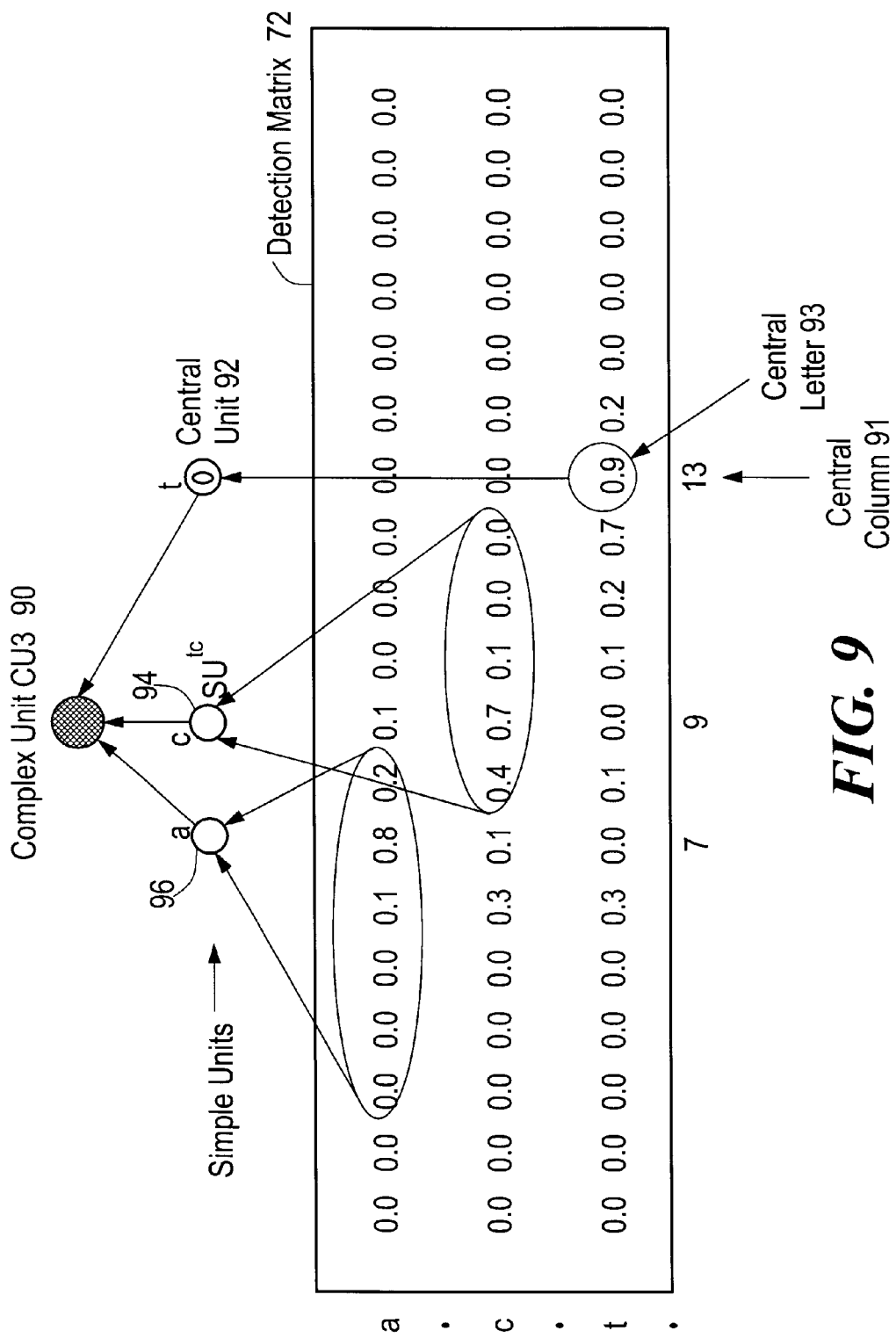
FIG. 9 illustrates a detection matrix corresponding to the pattern representing the word "act", having the central letter set to the detection matrix element for the letter "t" in the 13th column, and with the central unit of the complex unit CU3 associated with the letter "t" and located over the detection matrix element storing the activation value from the detection unit that has detected the letter "t" with probability 0.9.

For purposes of illustration, the connections between complex units and simple units are now further described with reference to a specific example. Given a recognizable object corresponding to the word "act", a word unit for the word "act" would consist of 3 complex units, denoted as CU1, CU2, and CU3. Each complex unit in this example consists of three simple units, including one central unit (the "central unit"), and two other simple units (the "simple units"), such that the complex unit receives input from the central unit and the two simple units. In this example, the complex unit CU1 has a central unit that is selective to the letter "a", and two simple units selective to the letters "c", and "t". The second complex unit, CU2, has a central unit selective to the letter "c", and two simple units selective to the letters "a" and "t", as shown by complex unit CU2 70 in FIG. 7. Similarly, the third complex unit CU3 90, as shown in FIG. 9, has a central unit that is selective to the letter "t", and two simple units are selective to the letters "a" and "c".

Figure 7:
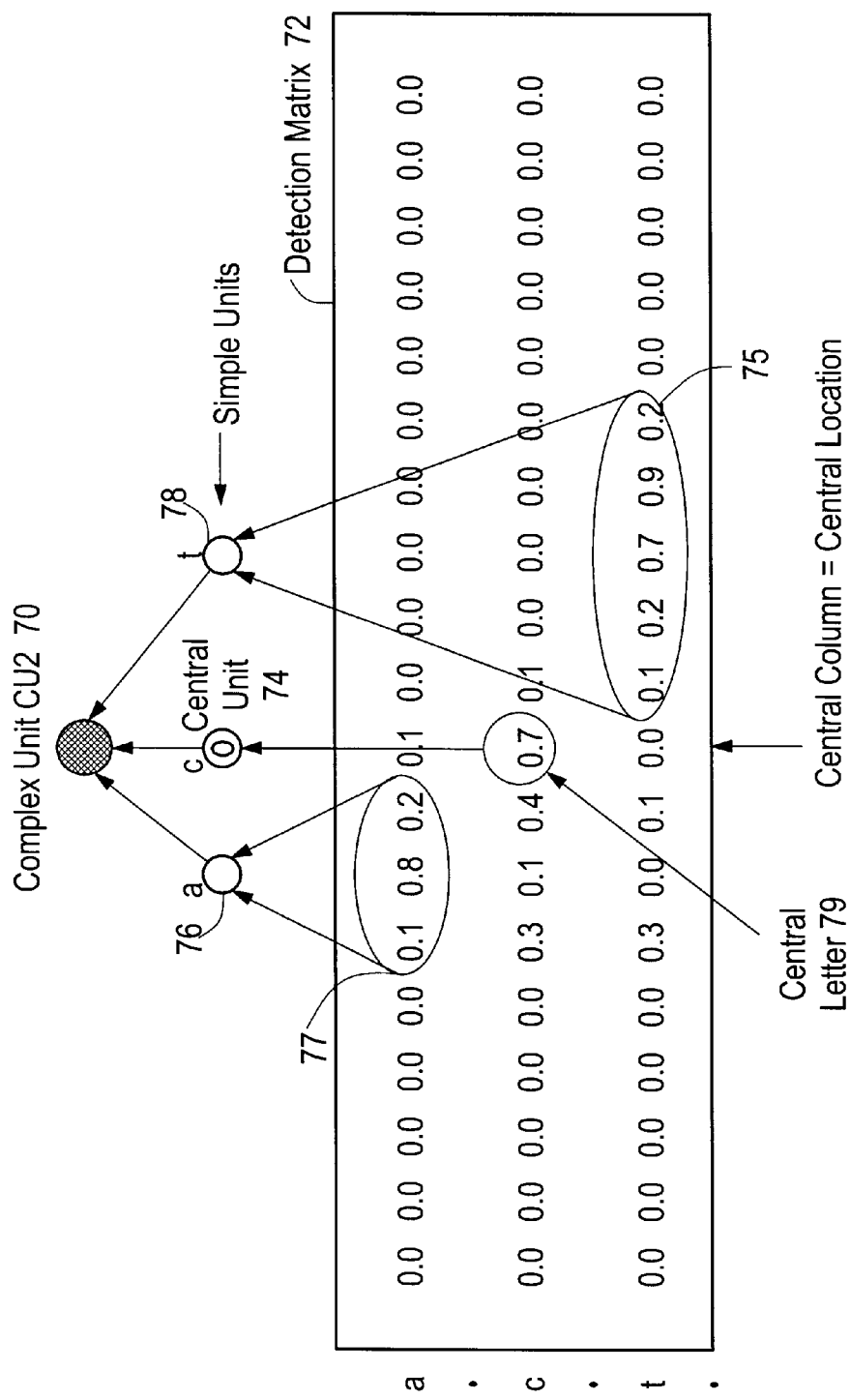
FIG. 7 illustrates a detection matrix corresponding to an input pattern representing the word "act", with the central unit of the complex unit CU2 associated with the letter "c", and located over the detection matrix element storing the activation value from the detection unit associated with the letter "c" that has detected the letter "c" with probability 0.7.

FIG. 7 illustrates a detection matrix 72 corresponding to an input pattern including the word "act". The central unit 74 of the complex unit CU2 70 is selective to the letter "c" and is located over the element 79 of the detection matrix 72 which indicates that a detection unit has detected the letter "c" with probability 0.7. This results in a non-zero activation level of the central unit 74. Similarly, simple units 76 and 78, that are selective to letters "a" and "t" respectively, contain detection matrix elements in their receptive fields 77 and 75 with relatively high values. As a result, the complex unit CU2 70 representing the word "act" from the point of view of the letter "c" will have a non-zero activation. The complex unit CU2 70 would have a relatively high activation value, since in this example all the letters that the complex unit CU2 70 is selective to are found at expected locations and are detected with high confidence.

Although any given simple unit is selective to only one associated letter, and has an activation level responsive to the presence of that letter within its receptive field, different specific locations of the letter within the receptive field produce different activation levels of a simple unit. The "strength" of the connection between a simple unit and a specific location within its receptive field is determined by the weight $$g_{\vec{x}}^{nij}.$$

Figure 6:
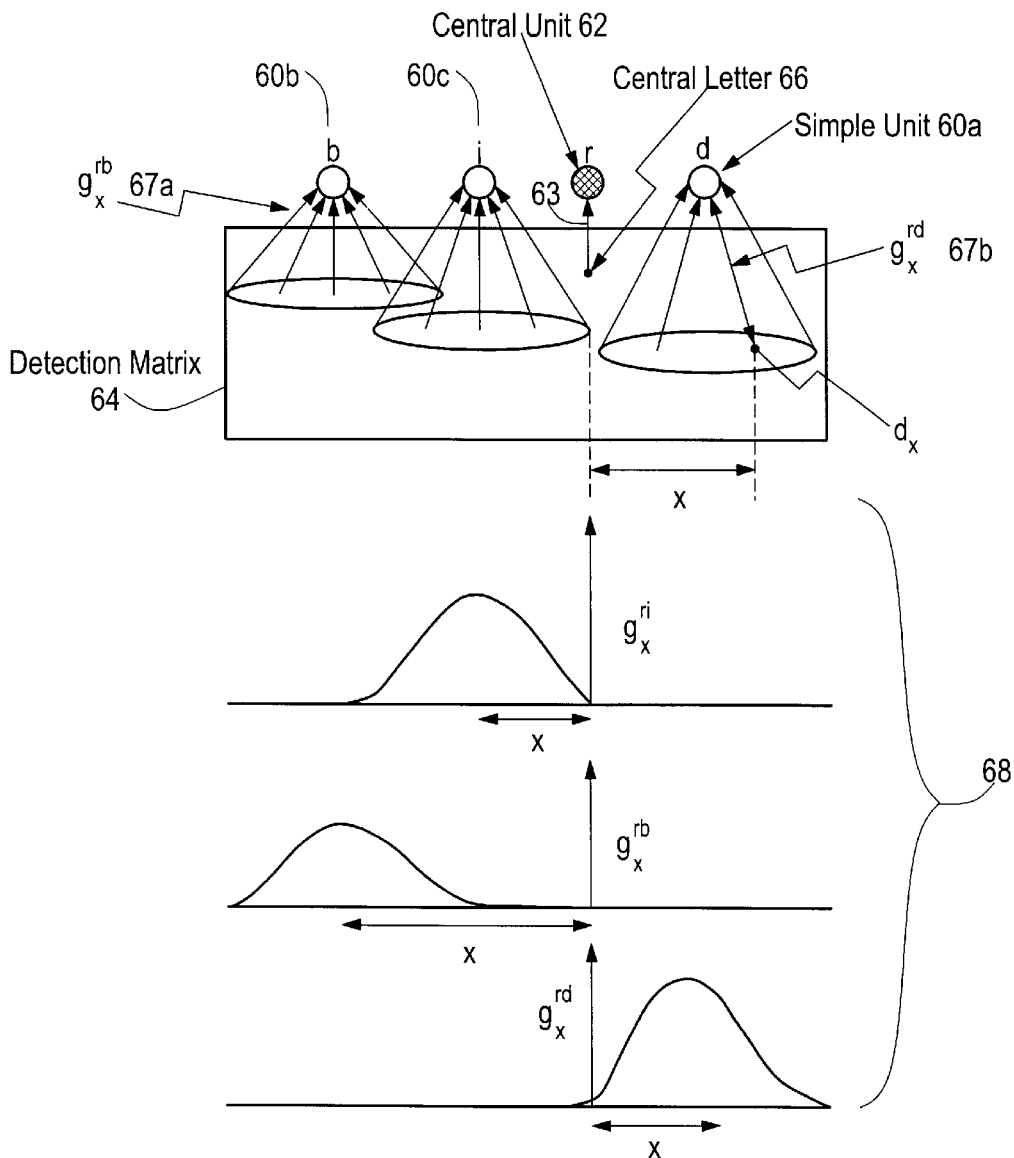
FIG. 6 shows three simple units and a central unit of a word unit for the word "bird"

The index j denotes the j-th simple unit of the i-th complex unit of the n-th dictionary word, and $\vec{x}$ is the relative position vector—the coordinate of the specific location within the receptive field with respect to a current location of the central letter, as further illustrated in FIG. 6. In an illustrative embodiment, the weight connecting a central unit to the central letter is set to 1.

FIG. 6 shows three simple units 60a, 60b and 60c, and a simple unit selected as central unit 62, of a word unit for the word "bird". Each letter of the word is represented with one of the simple units 60a, 60b, 60c or 62. The central unit 62 receives input from one element of the detection matrix 64 called the central letter 66, and the weight connecting the central unit 62 and the central letter 66 is set to 1. The graphs 68 in FIG. 6 illustrate the location estimates ($g^{ri}_x$, $g^{rb}_x$, $g^{rd}_x$) of the letters "i", "b", and "d" with respect to the location of the central letter "r" 66. Each of the graphs 68 is mapped, point by point, into the corresponding weights, illustrated by weights 67a and 67b, of the simple units above it. The location ($\vec{x}$) of a given letter within a simple unit's receptive field (R) is measured with respect to the location of the central letter 66.

A simple unit calculates a maximum among the elements in its receptive field (R) weighted by the strength of the connections between the simple unit and input elements. In this way, the output (activation level) of a simple unit reflects a combination of top down (location expectations) and bottom up (letter detections) information. The activation level of the j-th simple unit, of the i-th complex unit, of the n-th dictionary word is given as:

$$s^{nij} = \max_{\vec{x} \in R}\left(g_{\vec{x}}^{nij} d_{\vec{x}}^{k}\right), \qquad (2)$$

where k is the class of the j-th letter of the n-th dictionary word, and $\vec{x}$ represents the location of the j-th letter with respect to the location of the i-th letter.

The outputs of simple units are supplied to a common complex unit, whose activation level is given as $$c^{ni} = d_{\vec{x}=0}^{ni} \sum_{j=1, j \neq i}^{L_n} s^{nij}, \qquad (3)$$

where $$d_{\vec{x}=0}^{ni}$$

is the activation level of the central letter of the i-th complex unit of the n-th dictionary word, and $L_n$ represents the number of letters in the n-th dictionary word. From Eqs. (2) and (3) it is shown that simple and complex units perform different calculations. Each simple unit finds a maximum among its input elements $$(d_{\vec{x}}^{k})$$

weighted by the $$g_{\vec{x}}^{nij}$$

terms, while complex units each add the activation levels of their simple units together and then weight the result by the activation level of the central letter.

It is important to note that the spatial arrangement of the receptive fields of the simple units with respect to each other is fixed, but the position of the simple units over the detection matrix is not fixed. With every new choice of the location of the central letter (central location), which is determined by the selective attention module, the weights connecting simple units to the detection matrix are re-positioned, so that the central units always receive input only from the central letter. As a consequence of re-positioning the central units over each central location, the simple units are placed over different regions of the input pattern. This is an advantageous aspect of the disclosed system, and such repositioning of the simple units is analogous to "eye movements" during the human recognition process.

The combined receptive fields of all the simple units belonging to a single complex unit form a receptive field for that complex unit. The receptive fields of the simple units closer to the central unit are generally smaller than the receptive fields of the simple units further away from the central unit. Accordingly, a complex unit can estimate a letter's location with highest accuracy if that letter appears near the central location of the complex unit's receptive field.

Consider again, for purposes of example, the above mentioned word unit representing the dictionary word "act". As previously mentioned, this word unit consists of three complex units, where each complex unit contains one central unit. Given a central letter, every central unit (of every complex unit) is positioned over the location of the central letter so that every central unit receives the input from the same spatial location. In this way, the complex units are on "top of each other", in the sense that they all receive the same input. However, each complex unit will have a different activation level. For example, the choice of the central letter shown in FIG. 7 is likely to cause the complex unit CU2 70 to have a relatively high activation level, while the activation levels of other complex units (CU1 and CU2) will be very low or zero. The reason for this is described as follows: The central unit 74 of the complex unit CU2 70 is selective to the letter "c", and the activation level of the detection unit representing this letter is relatively high, in this case the central letter has a value of 0.7 79. Furthermore, the simple unit 78 selective to the letter "t" has within its receptive field 75 many elements with activation levels greater than zero. Assuming that all the weights connecting the simple unit 78 to the detection matrix 72 are equal, the element with activation level 0.9 in the receptive field 75 would be chosen as the maximal element for that simple unit. Similarly the simple unit 76 representing the letter "a" would choose the element from its receptive field 77 within the detection matrix 72 with activation level 0.8. The final activation levels, for the simple units of the complex unit CU2, would be: a(0.8), c(0.7) and t(0.9).

Figure 8:
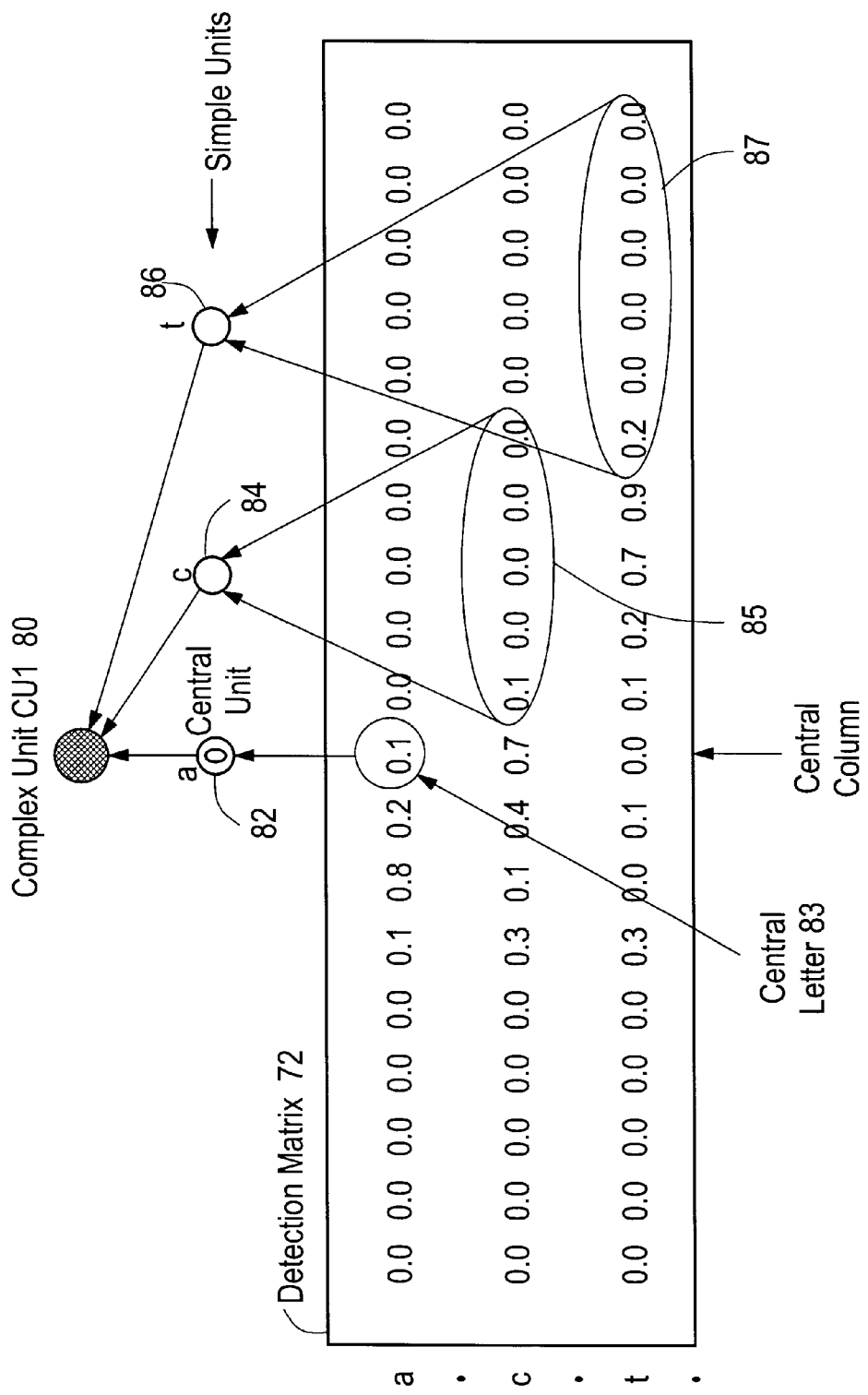
FIG. 8 illustrates a detection matrix corresponding to the input pattern representing the word "act", with the central unit of the complex unit CU1 associated with the letter "a", and located over the detection matrix element storing the activation value from the detection unit associated with the letter "a" that has detected the letter "a" with probability 0.1.

In contrast, generation of an activation level for the first complex unit CU1 80, while located over the same central location, is now described with reference to FIG. 8. FIG. 8 shows the detection matrix 72 corresponding to the pattern representing the word "act", with the central unit 82 of the complex unit CU1 80 selective to the letter "a", and located over the activation level output of the detection unit that has detected the letter "a" with probability 0.1. This results in a relatively low activation level for the central unit 82. Similarly, simple units 84 and 86 that are selective to letters "c" and "t" respectively contain in their receptive fields 85 and 87 elements with very small activation values. As a result, the complex unit CU1 80, representing the word "act" from the point of view of the letter "a", will have a very small activation level.

In other words, the central unit 82 receives its input the activation level 0.1 from the detection unit selective to the letter "a", and the simple unit 84 representing the letter "c" sees in its receptive field only one element with a non-zero activation level (0.1). The last simple unit 86, representing the letter "t", selects the element with activation 0.2 as the element in its receptive field having the highest value. The final activation levels for the simple units of the complex unit CU1 80 are accordingly a(0.1), c(0.1) and t(0.2). Thus it is seen that the activation level of the complex unit CU2 70 shown in FIG. 7 is much higher than the activation level for the complex unit CU1 80 shown in FIG. 8, for this choice of central column.

In this way, it is shown that each complex unit of a given word unit represents one "view" of the word. In other words, each complex unit represents the word from the point of view of the central letter. Equation (1) above can therefore be understood as a view invariant representation of a word, since the summation is done over all possible views.

Recognition Phase and Inter-Connection Units

A significant property of the disclosed system is the interplay between parallel and sequential processing. During the recognition phase all the simple, complex and word units of the binding network may be accessed and activated in parallel, but the recognition of the pattern consists of a sequence of steps. At each step a central location (the location of the central letter) is selected, and the binding network is repositioned over the detection matrix in such a way that the central units are placed over the selected central location.

For some patterns, the first positioning of the binding network (the first excitation of the complex units) may result in correct segmentation of the pattern, and hence the correct recognition of the pattern. Whether recognition is completed in one or many steps depends on many things, including:

a) how clearly the letters are written,
b) how close the dictionary word representing a pattern is to other dictionary words, (e.g. the word "act" is close to the words "ant" and "art"),
c) how long the word is, (long words usually require many repositionings of the binding network), and/or
d) the location of the first central letter. The best results are obtained if the starting location is around the middle of the pattern.

In the beginning of the recognition process, an element from the detection matrix having the highest activation value is selected as the central letter, and the binding network is positioned with the central units over the central location. All the simple units then select a corresponding letter (an element from the detection matrix) from their receptive fields according to Eq. (2) above. The activation levels of the simple units propagate and excite all the complex units, eventually translating into activations of all the word units. The word unit that has the highest activation among all the word units is called the active word unit. Only one complex unit from every word unit wins, while activations of other complex units, from the same word unit, are suppressed. The central letter then becomes the active letter. In general, a central letter becomes an active letter only if its location is in accordance with locations of other active letters.

The second step of the recognition process starts with the selection of the next central letter, also referred to as the "target letter". The selective attention performs this selection, and the selected target letter is not necessarily the element from the detection matrix having the highest activation level. We can think of elements of the detection matrix as being modified (multiplied) by predetermined weights associating the simple units and the specific elements in the detection matrix within their respective receptive fields. Accordingly, by shifting the binding network, the network system sees the input pattern from a new perspective, and, as a result, the input is dynamically "biased" through the new orientation of the weights of the simple units to the detection matrix. This illustrates an initial feedback interaction provided by the disclosed system. At this point, the feedback helps "navigate" through the input pattern, by selecting locations within the pattern for further processing, in order to shorten the recognition process as much as possible.

A complex unit segments a pattern into a set of letters by selecting the set of letters from the detection matrix using its simple units. This segmentation can be called a "potential" or "tentative" segmentation, and it is not necessarily the correct one. A given complex unit only provides the segmentation from the point of view of that complex unit, and the "final" segmentation is the result of combining the potential segmentations from all complex units within an active word unit. The final segmentation of the pattern consists of only active letters, since the relative locations of active letters are always in agreement with each other. The relative locations between non-active letters (those letters selected by non-central simple units) do not always have to be in mutual agreement. In the case of handwriting recognition, the correct relative locations between letters assumes correct ordering of letters. These operations are again illustrated using the word "act" as an example.

With reference to FIG. 9, and for purposes of illustration, the first central letter selected by the selective attention module may be the letter "t" 93 located at the 13-th column of the detection matrix 72. FIG. 9 includes the detection matrix 72 corresponding to the input pattern representing the word "act", and having the central letter set to the letter "t" 93 from the 13-th column (central column 91), and with the central unit 92 of the complex unit CU3 90 selective to the letter "t", and located over the activation value of the detection unit that has detected the letter "t" with probability 0.9. If the weights connecting simple units 92, 94, and 96 and the detection matrix 72 are all equal, then the complex unit CU3 90 segments the pattern into letters "a", "c" and "t" found at columns 7, 9 and 13 with activation levels 0.8, 0.7 and 0.9 respectively.

Further, for purposes of illustration, the weights connecting simple units 92, 94 and 96 with the detection matrix 72 are all set to 1. The activation level of the complex unit CU3 90, belonging to the word "act", is then 0.9 (0.7+0.8)=0.135. This activation level is propagated to the word unit representing the word "act", $WU^{act}$, and the activation of the $WU^{act}$ becomes 0.135. The only active letter so far is the letter "t" from the 13-th column. The selective attention module then chooses another central letter, for example the letter "a" located in the 7-th column of the detection matrix. The binding network is then repositioned as illustrated in FIG. 10.

Figure 10:
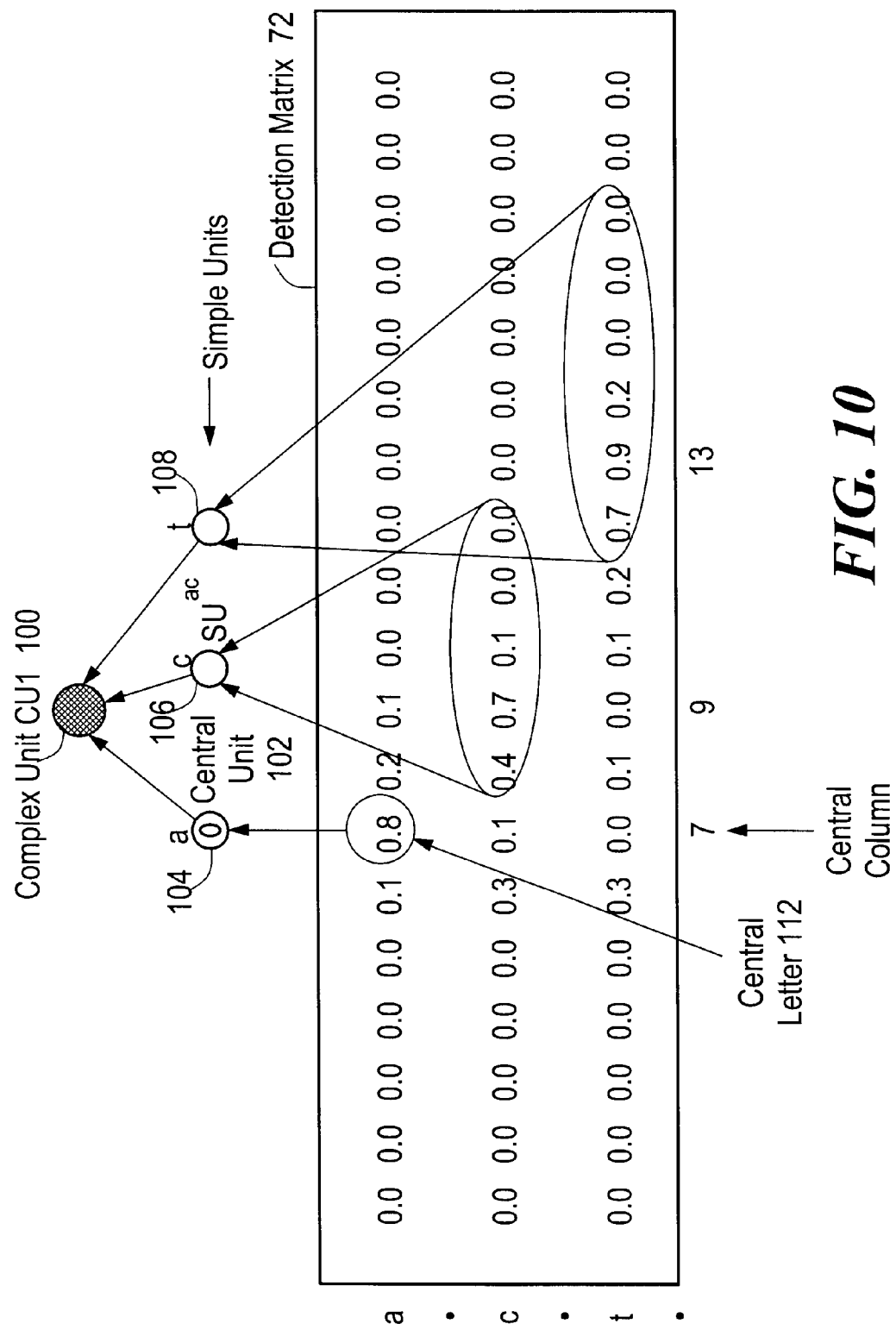
FIG. 10 illustrates a detection matrix corresponding to the pattern representing the word "act", where the central letter is the letter "a" from the 7-th column, and having the central unit of the complex unit CU1 is associated with the letter "a" and located over the activation value in the detection matrix from the detection unit that has detected the letter "a" with probability 0.8.

In FIG. 10, the detection matrix 72 corresponding to the pattern representing the word "act" is shown with the central letter "a" from the 7-th column, and having the central unit 102 of the complex unit CU1 100, which is selective to the letter "a", located over the activation level output of the detection unit that has detected the letter "a" with probability 0.8. If the weights connecting simple units 104, 106 and 108 to the detection matrix 72 are all equal, then the complex unit CU1 100 segments the pattern into letters "a", "c" and "t", as found at locations (columns) 7, 9 and 13 with activation levels 0.8, 0.7 and 0.9 respectively.

The activation level of the complex unit CU1 100 is accordingly 0.8(0.7+0.9)=0.128, and the activation level of the word unit $WU^{act}$ is updated to $WU^{act}$=0.135+0.128= 0.267. The active letters are now the letters "t" and "a". Finally, the selective attention module selects the letter "c" from column 9 of the detection matrix as the target letter, and the binding network is shifted so that the central units are over column 9, as shown in FIG. 7. The input pattern is again segmented into the same set of letters and the activation level of the complex unit CU2 70 becomes 0.7 (0.8+0.9)= 0.112. The final activation of the word unit $WU^{act}$ becomes 0.112+0.267=0.379, and the set of active letters becomes "a", "c" and "t". This concludes the segmentation of the input pattern, such that the letters "a", "c" and "t" have been chosen from specific locations in the detection matrix 72. Recognition of the input pattern is then complete, since all the letters of the dictionary word "act" are now active.

Figure 11:
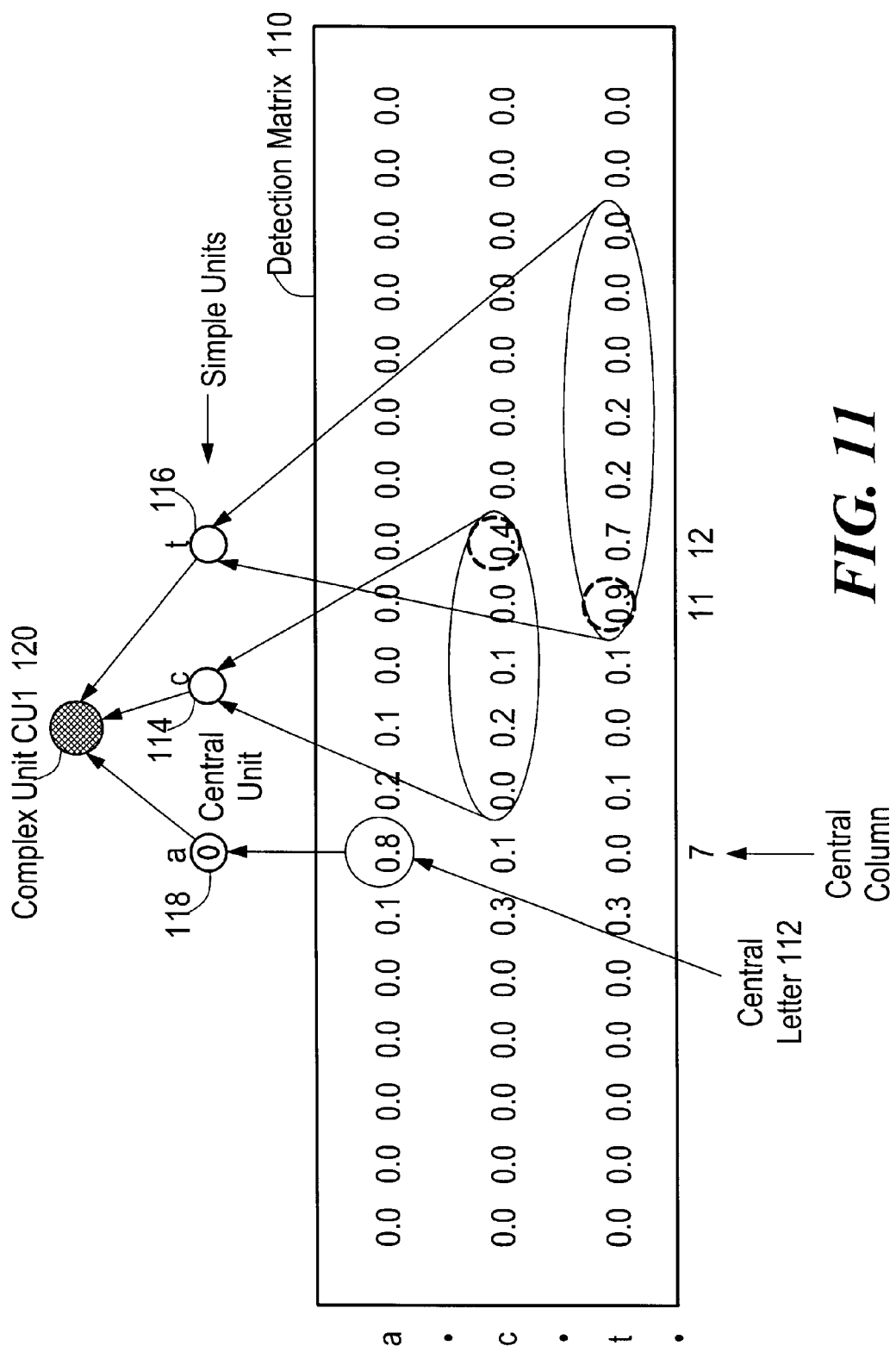
FIG. 11 illustrates a detection matrix corresponding to the pattern representing the word "act", with the central letter equal to the letter "a" from the 7-th column, and having the simple unit associated with the letter "c" over the activation value for the letter "c" from the 12-th column, and the simple unit associated with the letter "t" over the activation value for the letter "t" from the 11-th column.

In the foregoing example, the first complex unit segmented the pattern correctly. However, the recognition process can be much more complicated. An example of a more complicated recognition is shown in FIG. 11. FIG. 11 includes a detection matrix 110 corresponding to an input pattern representing the word "act", and with the central letter 112 "a" from the 7-th column. The simple unit 114 is selective to the letter "c" selects the letter "c" from the 12-th column. The simple unit 116, selective to the letter "t", selects the letter "t" from the 11-th column. The segmentation of the pattern determined by the complex unit CU1 120 is therefore "atc", which is an incorrect segmentation.

The non-active letters "c" and "t" selected by the simple units 114 and 116 have correct locations with respect to the central letter 112, but not with respect to each other. This erroneous result is due to the fact that the receptive fields of the simple units 114 and 116 are large and overlapping. In general, the farther a simple unit is from the central unit, the larger its receptive field is, and the larger the amount of overlapping with neighboring simple units.

At every point in time, during the recognition process, all simple units perform local operations independently of each other. The result of processing by the simple units, within a given complex unit, is the set of letters that maximally excite the simple units within that complex unit. Each letter is defined by its class (row) and location (column) within the detection matrix. The set of selected letters, selected by a complex unit, represents the input pattern from a point of view of that complex unit and its current central letter. It is important to notice that each letter of a given word unit is selected by a set of many simple units that are part of different complex units. What these simple units have in common is that they belong to a common word unit and represent the same letter. Therefore, every one of these simple units should select the same location for the letter it represents and is selective to. However, since all simple units operate independently of each other, different complex units may choose different locations for the letters that represent the word.

Consider again the previous example, recognition of the word "act", as illustrated in FIGS. 9, 7 and 10, but with the assumption that the weights connecting the simple units and the elements in the detection matrix are not equal to 1. In this way, the following scenario can be described: The simple unit 94 of the complex unit CU3 90 that is selective to the letter "c" selects the letter from the 9-th column (with activation 0.7), and the simple unit 106 of the complex unit CU1 100 that is again selective to the letter "c" chooses the letter from the 8-th column (with activation 0.4). This situation can occur if the weight connecting the letter "c" from the 8-th column to the simple unit 106 are much larger than the weight connecting the letter "c" from the 9-th column to the simple unit 106. These two choices for the position of the letter "c" (each coming from a different complex unit) would improperly result in two different segmentations for the same pattern.

In order to prevent this situation, simple units have to "communicate" with each other and select the same locations for the letters they represent. This is accomplished through the interconnection (IC) units. The IC units can be thought of as bookkeepers for the simple units. Every IC unit is class (letter) specific, and is connected to the simple units of different complex units that represent the same letter from a given word. Given a dictionary word, the number of IC units is the same as the number of letters within a word. The set of simple units connected to the same IC unit, together with the IC unit, is referred to as a "cluster". FIG. 12 illustrates the connections between IC units and simple units of a given word unit.

FIG. 12 illustrates connections between interconnection units 120 and simple units 122 of one word unit. All the units from one row represent simple units of one complex unit. The task of interconnection units is to allow communication between different simple units since the operations performed by the simple units are local and independent of each other.

Each of the simple units 122 provides the associated IC unit, from the same cluster, with information about the location of the letter that has been selected by the simple unit according to Eq. (2) above. This location is stored as the absolute coordinate of the letter, so it is measured with respect to some fixed point within the detection matrix. It is significant to notice that the stored coordinate of the letter's position is not with respect to the location of the central letter, since the central locations change throughout the recognition process. Another component of the information provided by a simple unit to the IC unit is a location estimate of the letter selected by the simple unit. This is basically the value of the weight connecting the simple unit to the selected letter from the detection matrix.

Let us consider the processing of the j-th IC unit of a given dictionary word. From this point on, we will focus on the particular dictionary word and omit the index n that labels the dictionary words. The term $$g_{\vec{x}}^{ij}$$

represents a likelihood of finding the j-th letter of the given dictionary word at location $\vec{x}$ with respect to the location of the i-th letter of the given dictionary word. If $$g_{\vec{x}}^{ij} = 0,$$

then that means that the j-th letter of the given dictionary word cannot be found at location $\vec{x}$ with respect to the location of the i-th letter of the given dictionary word. This term is referred to as the location estimate of the letter that has been chosen by the j-th simple unit of the i-th complex unit of the given dictionary word. For i=j the estimate is supplied by the central unit, and for i≠j it is supplied by the simple unit. Location estimate values that are stored in the j-th IC unit we will denote as $\vec{G} = g^{1j}, g^{2j}, \ldots, g^{Lj}$, where L is the number of the simple units connected to the j-th IC unit. The location estimate supplied by the central unit is by default set to one, where all other location estimates are less than one. At the same time we will denote by $\vec{X} = X^{1j}, X^{2j}, \ldots, X^{Lj}$, the locations of the selected letters, with respect to some fixed point—their absolute coordinates. Then, the j-th IC unit calculates:

$$g^{j^*} = \max_{1 \leq i \leq L}(g^{ij}) = \max(\vec{G}) \qquad (4)$$

The element from the vector $\vec{X}$ corresponding to the element $g^{j^*}$ from the vector $\vec{G}$, is denoted by $X^{j^*}$, and it represents the location of the letter that is selected by the IC unit. This location is referred to as the IC location, and similarly, the value $g^{j^*}$ is referred to as the IC value. Activation levels of all the simple units that do not agree with this location, i.e. have selected letters with locations different than the location $X^{j^*}$, are suppressed—set to zero. In this way, it is assured that every letter of the word has only one location which guarantees the unique segmentation. From Eq. (4), it follows that, in situations where there is a disagreement among the simple units as to what the location of a letter should be, the selected location is the one that is more likely to be correct.

Feedback and Processing of Simple Units

The processing of a simple unit is highly dependent on the IC unit from the same cluster. We will consider the processing of the simple units from the cluster of the j-th IC unit. Depending on the state of the IC unit, whether it contains any location estimate and which simple units have supplied the estimate, the operation of a simple unit can be divided into the following illustrative cases:

a) The maximal location estimate of the j-th IC unit is zero, $g^{j^*}=0$. This situation occurs in the beginning of the recognition process, when none of the simple units have been activated, and therefore no information has been supplied to the j-th IC unit. In this case the simple unit chooses a letter according to Eq. (2).

b) The j-th IC unit's maximal location estimate, $g^{j^*}$, is non-zero but less than one. The fact that the IC value for the location of the selected letter is less than one, means that the central unit has not supplied a location estimate and that at least one of non-central simple units have supplied the location estimate.

In this case the IC unit influences the processing of the simple unit by changing its receptive field. We will denote by "Re" the "reduced" receptive field of the (j-th) simple unit (of the i-th complex unit), whose elements are points for which $$g_{\vec{x}}^{ij} \geq g^{j^*},$$

and $g^{j^*}$ is the location estimate supplied by the j-th IC unit. This definition means that the domain Re contains the locations at which the letter is more likely, or equally likely to occur, compared to the location supplied by the j-th IC unit.

If the domain Re is not an empty set of elements from the detection matrix, then the activation value of the simple unit is:

$$s^{ij} = \max_{\vec{x} \in Re}(g_{\vec{x}}^{ij} d_{\vec{x}}^{k}), \qquad (5)$$

Recall that k is the class of the j-th letter of the given dictionary word, and $\vec{x}$ is its distance from the i-th letter of the same dictionary word. Let us denote by $\tilde{g}$ the value of the location estimate, and by $\tilde{X}$ the location for which the $s^{ij}$ in Eq. (5) reaches the maximal value. Then, if $s^{ij}>0$, the location estimate $\tilde{g}$ of the letter with location $\tilde{X}$ becomes the value stored in the j-th IC unit, $\tilde{g} \to g^{j^*}$, If $s^{ij}$ from Eq. (5) is equal to zero, or the domain Re is an empty set, then the previously selected letter in the IC unit remains intact. The activation value of the simple unit is given as:

$$s^{ij} = g^{ij}_{x^{j*}} d^k_{x^{j*}}, \qquad (6)$$

where the position $x^{j*}$ is obtained from the location estimate $X^{j*}$ stored in the j-th IC unit. Recall that the location $x^{j*}$ is expressed in local coordinates, while the location $X^{j*}$ is expressed in absolute coordinates. If the previously selected location $x^{j*}$, with location estimate value $g^{j*}$, is not within the simple unit's receptive field, then the simple unit's value is zero.

The fact that the receptive field of the simple unit can be changed, depending on the state of j-th IC unit, illustrates the influence of the contextual knowledge on the processing of the simple units. In this case the feedback information can help reduce the search time for the maximal element of the simple unit.

c) The expectation value of the j-th IC unit, $g^{j*}$, is equal to one. This means that the location estimate value of the j-th IC unit has been supplied by the central unit, and that the IC location represents the location of the active letter. The activation of the simple unit is given by Eq. (6). Based on the value of the simple unit's activation ($s^{ij}$) we differentiate two cases:

1) If $s^{ij}>0$, it means that the location of the active letter is within the simple unit's receptive field. The expectation value of the j-th IC unit is unchanged, and the activation value of the simple unit is propagated to the complex unit.

2) If $s^{ij}=0$, it means that the location of the active letter is not within the simple unit's receptive field. In this case the active letter from the j-th IC unit, its location, is in conflict with the location of the central letter since it is not in the region (simple unit's receptive field) where it is expected to be.

A Conflict Between the Central Letter and Active Letters—Resolve Conflict Mode

Figure 13:
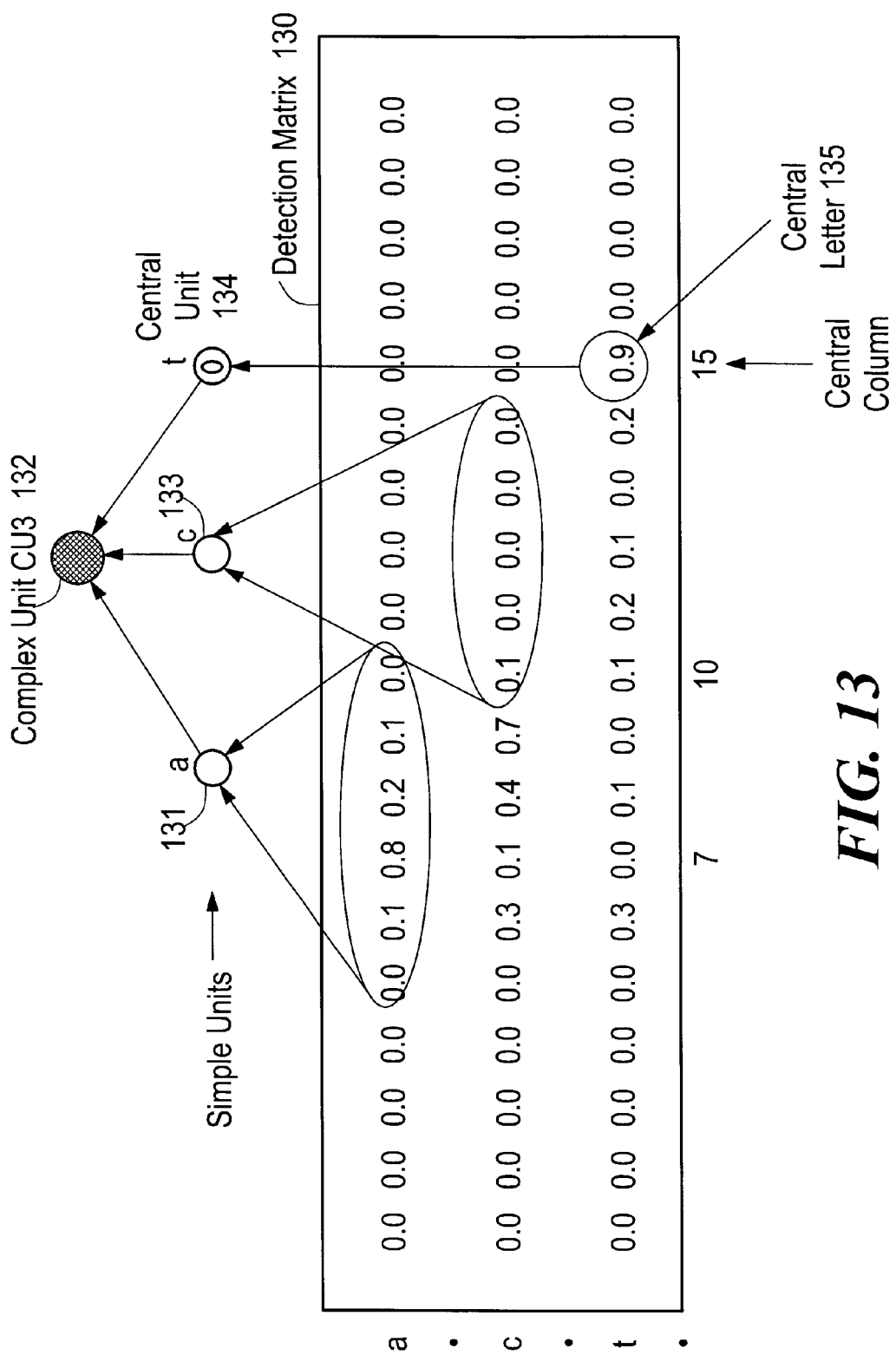
FIG. 13 illustrates a detection matrix corresponding to the pattern representing the word "act", in which the central letter is the letter "t" from the 15-th column, the central unit of the complex unit CU3 is associated with the letter "t" and is located over the detection matrix element storing the activation value from the detection unit that has detected the letter "t" with probability 0.9.
Figure 14:
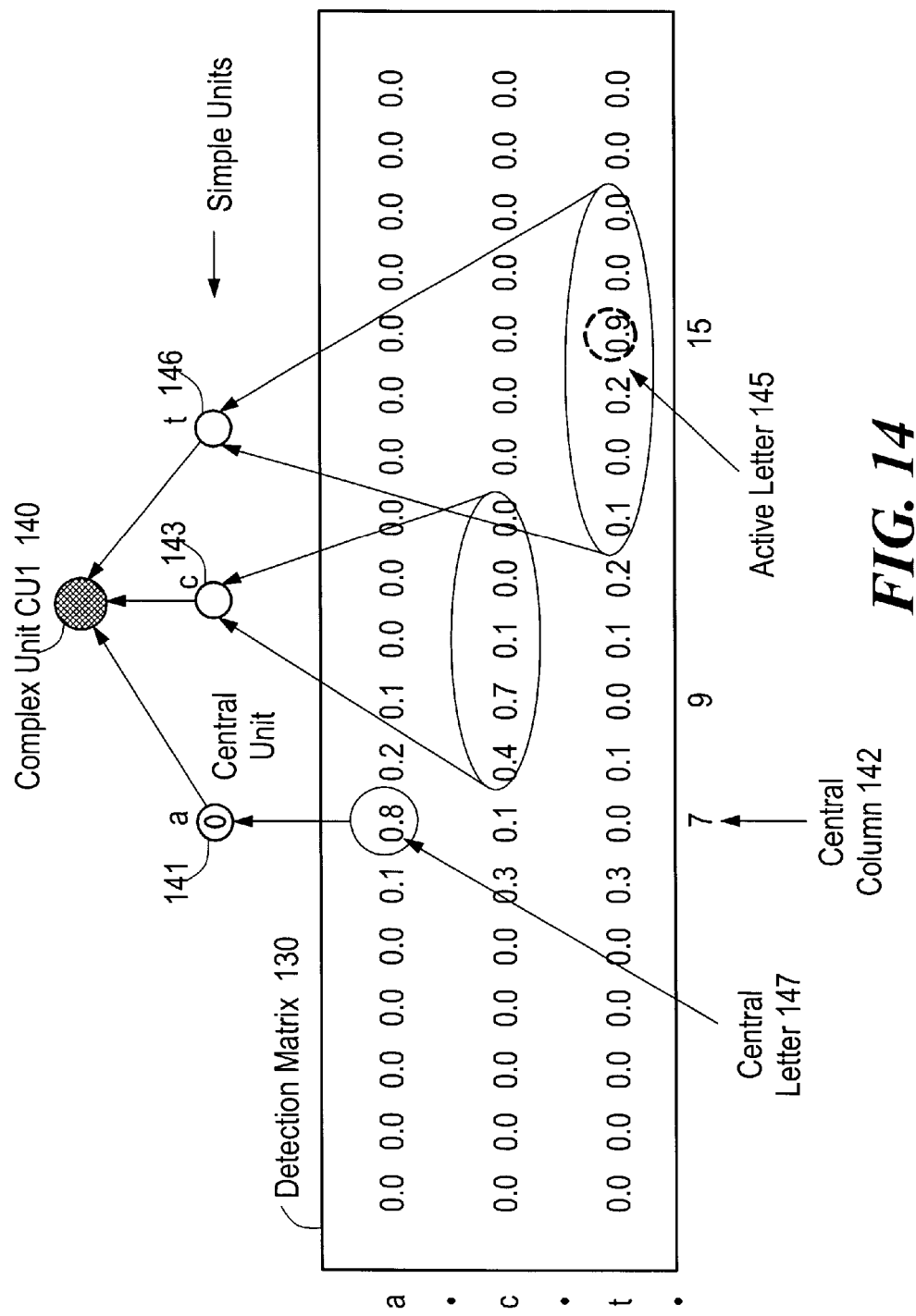
FIG. 14 illustrates a detection matrix corresponding to the pattern representing the word "act", where the central letter is the letter "a" from the 7-th column, and the central unit of the complex unit CU1 is associated with the letter "a" and is located over the detection matrix element storing the activation level of the detection unit that has detected the letter "a" with probability 0.8.

In the previous section it was shown that different simple units representing the same letter from the word unit could select, during the recognition process, letters from different locations. In order to solve that problem we introduced the IC units. Another problem related to independent processing of simple units occurs when the central letter is not at the correct location with respect to one or more active letters. This situation is described by the following example, as illustrated in FIGS. 13, 14 and 15.

The input pattern is again the word "act", but the detection matrix 130 is modified with respect to preceding figures. The location of the letter "t" with activation 0.9 is shifted further away from the letters "a" and "c" and is placed in the column 15 of a detection matrix 130. FIG. 13 illustrates processing of the complex unit CU3 132 with central unit 134 positioned over the central letter "t" at column 15. If the weights connecting simple units 131, 133 and 134 to the detection matrix 130 are all equal, then the complex unit CU3 132 segments the input pattern into letters "a", "c" and "t" found at locations (columns) 7, 10 and 15, with activation levels of 0.8, 0.1 and 0.9 respectively. The only active letter so far is the letter "t". Then, the new target letter is selected as the letter "a" located at position (column) 7 in the detection matrix, and the complex unit with the highest activation becomes the complex unit CU1 140 as shown in FIG. 14. CU1 140 then segments the input pattern into letters "a", "c" and "t" found at locations 7, 9 and 15 with activation levels 0.8, 0.7 and 0.9 respectively. The location of the central letter 147 is in agreement with the location of the active letter "t" 145, since the location of the letter "t" is within the expected region marked by the receptive field of the simple unit 146 selective to the letter "t". At this point the letters "a" and "t" with positions 7 and 15 are the active letters. We will assume that the next target letter is the letter "c" from the 9-th column. FIG. 15 shows clearly that the location of the active letter "t" is not within the expected region, which is the receptive field of the simple unit, representing the letter "t".

Figure 15:
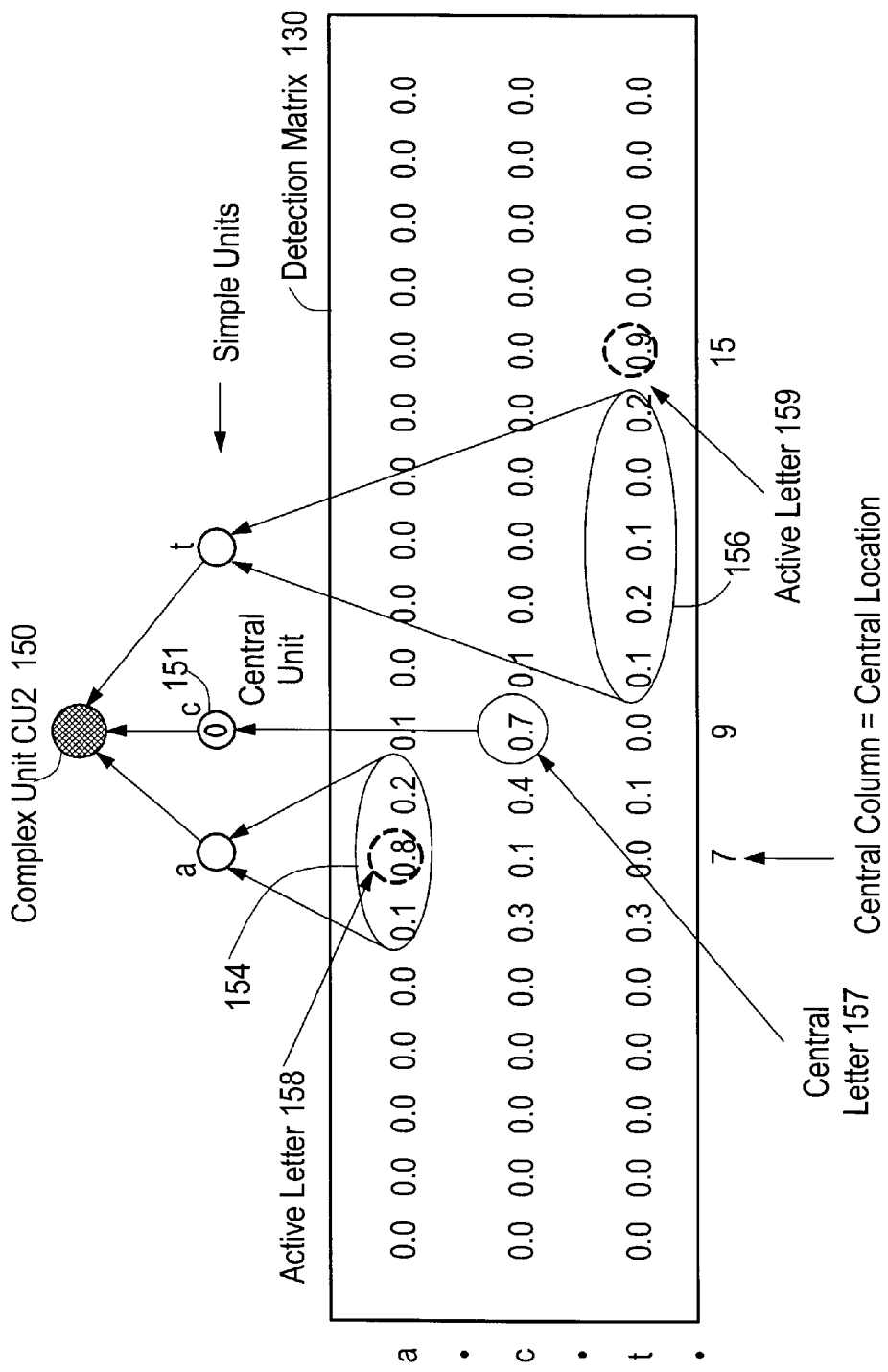
FIG. 15 illustrates a detection matrix corresponding to the pattern representing the word "act", in which the central letter is the letter "c" from the 9-th column, and where the central unit of the complex unit CU2 is associated with the letter "c" and is located over the element of the detection matrix storing the activation value of the detection unit that has detected the letter "c" with probability 0.7.

FIG. 15 illustrates the detection matrix 130 corresponding to the pattern representing the word "act", in which the central letter 157 is the letter "c" from the 9-th column, and where the central unit 151 of the complex unit CU2 150 is selective to the letter "c" and is located over the activation level of the detection unit that has detected the letter "c" with probability 0.7. The active letter "a" 158 corresponds to the region 154 of a simple unit selective to the letter "a", but the location of the active letter "t" 159 is not within the expected region 156 which is the receptive field of the simple unit selective to the letter "t". In this case, the central letter 157 is said to be in conflict with active letter "t" 159.

In general, the central letter can be in conflict with more than one active letter. Since only the active letters represent the valid segmentation of the pattern, the locations of the active letters, for example expressed by their mutual distances, must be in agreement with each other. If the central letter is to become an active letter then the other active letters that are in conflict with it have to be dismissed. Otherwise the central letter is dismissed. This choice between the central letter and other active letters that are in conflict with the central letter is resolved by considering the activation of the word unit with and without the central letter, and by choosing the configuration that produces higher word unit activation.

The active letters that are in conflict with the central letter are called conflict letters, whereas the active letters that are not in conflict with the central letter are named support letters. The activation of the word unit without the new complex unit is called the "old word value". The new complex unit is the unit that has as the central letter the new central letter that is in conflict with existing active letters.

In order to calculate the activation level of the word unit represented with the central letter and without the conflict letters, the activation levels of all the conflict letters have to be suppressed. That means that the activation levels of all the complex units that contain them as central letters will be suppressed too. This, in turn, produces the suppression of activation levels of the simple units associated with the complex unit and therefore the location estimates that the simple units supplied to their IC units will also be suppressed. In this way every influence of the conflict letters on the word unit will be suppressed. Now, we will focus on the description of the simple units that belong to the complex unit that contains the central unit activated by the central letter. Their activation levels are calculated according to Eq. (5) or Eq. (6). The activation level of the complex unit they belong to is calculated according to Eq. (3), which is added to the activation level of the word unit according to the Eq. (1). The activation level of the word unit calculated in this way is called the "new word value". If the "new word value" is greater than the "old word value", then all the active letters that were in conflict with the central letter are replaced by the letters found by the simple units that have signaled the conflict.

If the "new word value" is smaller than the "old word value", the central letter is canceled. The word value remains unchanged.

Search for the Central Letter

Figure 16:
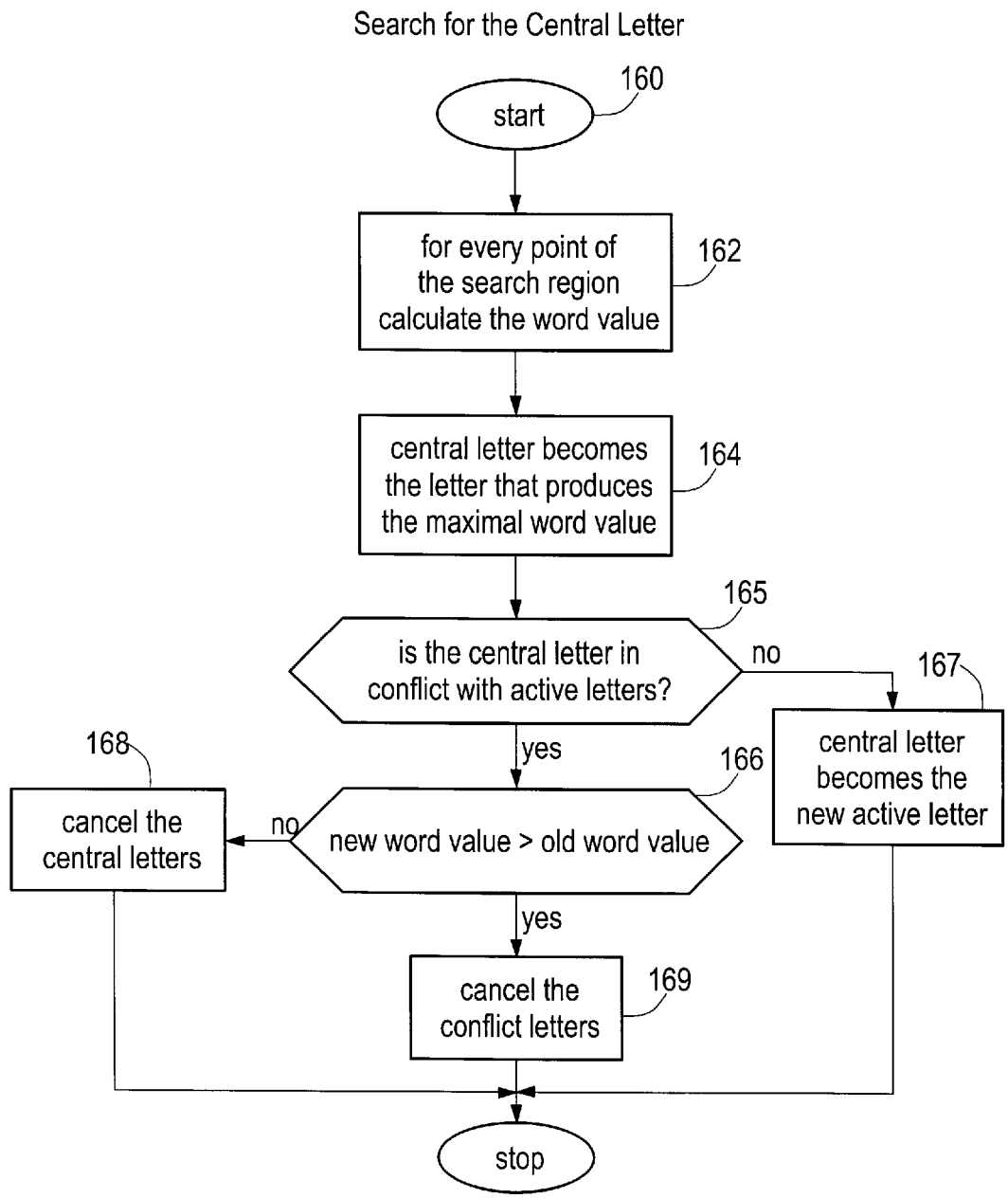
FIG. 16 is a flow diagram depicting the Search for the Central Letter algorithm.

The procedure in an illustrative embodiment for accepting or canceling the central letter when it is in conflict with some other active letters is set forth above. However, instead of canceling the central letter, it is sometimes more advantageous to try to find a new location for the central letter that is not in conflict with any of the existing active letters, and which produces an even higher word activation value. A procedure for finding a "non-conflict location" and a "non-conflict" central letter is now described, as illustrated in FIG. 16 beginning at step 160.

In short, whenever the central letter is in conflict with previously discovered active letters, the disclosed system probes the local neighborhood around the central letter (the "search region") in order to find a letter of the same class as the central letter, but whose location is in agreement with other active letters.

The search region is defined to be the region of the detection matrix that can potentially contain the location of the letter that is not in conflict with other active letters. All the points of the search region are target points, meaning that each of them would become a central location during the recognition process. Since the system knows the class of the letter it is looking for, the goal of the search algorithm is to find the location of the letter that results in a maximum associated word activation level. Recall that the IC unit of the active word, that is in the same cluster as the central unit, contains location estimates for the letter it represents, and therefore the location estimate for the central letter. The search region is given as the union of the default area—designed by the programmer/designer, and all the expected locations from the IC unit that is in the same cluster as the central unit. The center of the default area coincides with the position of the central letter selected by the selective attention module.

For example, let us assume that the pattern represents the word "after" and that the active letters are the letters "a" and "r". We will assume that the detection unit that is selective to the letter "f" and is positioned over the section of the pattern containing the letter "t" has high value. That means that the letter detector incorrectly recognizes the section of the pattern representing the letter "t" as the letter "f". The location of the central letter "f" causes a conflict with active letters "a" and "r". The system then searches for the letter "f" at some other locations. The search region is the local area around the location where the letter "f" was incorrectly detected and the locations suggested by the IC unit from the same cluster as the letter "f". The IC unit contains information about the expected location of the letter "f" provided by the letter "a"—from the point of view of the location of the letter "a", and expected location of the letter "f" provided by the letter "r"—from the point of view of the location of the letter "r".

Every point of the search region is explored independently. An element from the detection matrix, belonging to the search region, is chosen as the central letter. At step 162 of FIG. 16, a new value of every word unit, in particular the value of the active word unit, is then obtained. The goal is to find the location of the letter, within the search region, that elicits the highest word unit activation value. The maximal value of the active word unit, found by exploring the points of the search region, becomes the "new word value". The location of the central letter, found in this way at step 164 of FIG. 16, may or may not be in conflict with other active letters. Specifically:

a) If the location of the central letter is in conflict with other active letters, as determined at step 165, and if the "new word value" is determined to be greater than the "old word value" at step 166 of FIG. 16, then the conflict letters are canceled at step 169. Otherwise, if at step 166 it is determined that the "new word value" is less than or equal to the "old word value", then the central letter is canceled at step 168.

b) If the location of the central letter is not in conflict with other active letters, as determined at step 165, then at step 167 the location of the central letter becomes the new central location and the central letter becomes the new active letter. The "new word value" is in this case is always greater than the "old word value".

Figure 17:
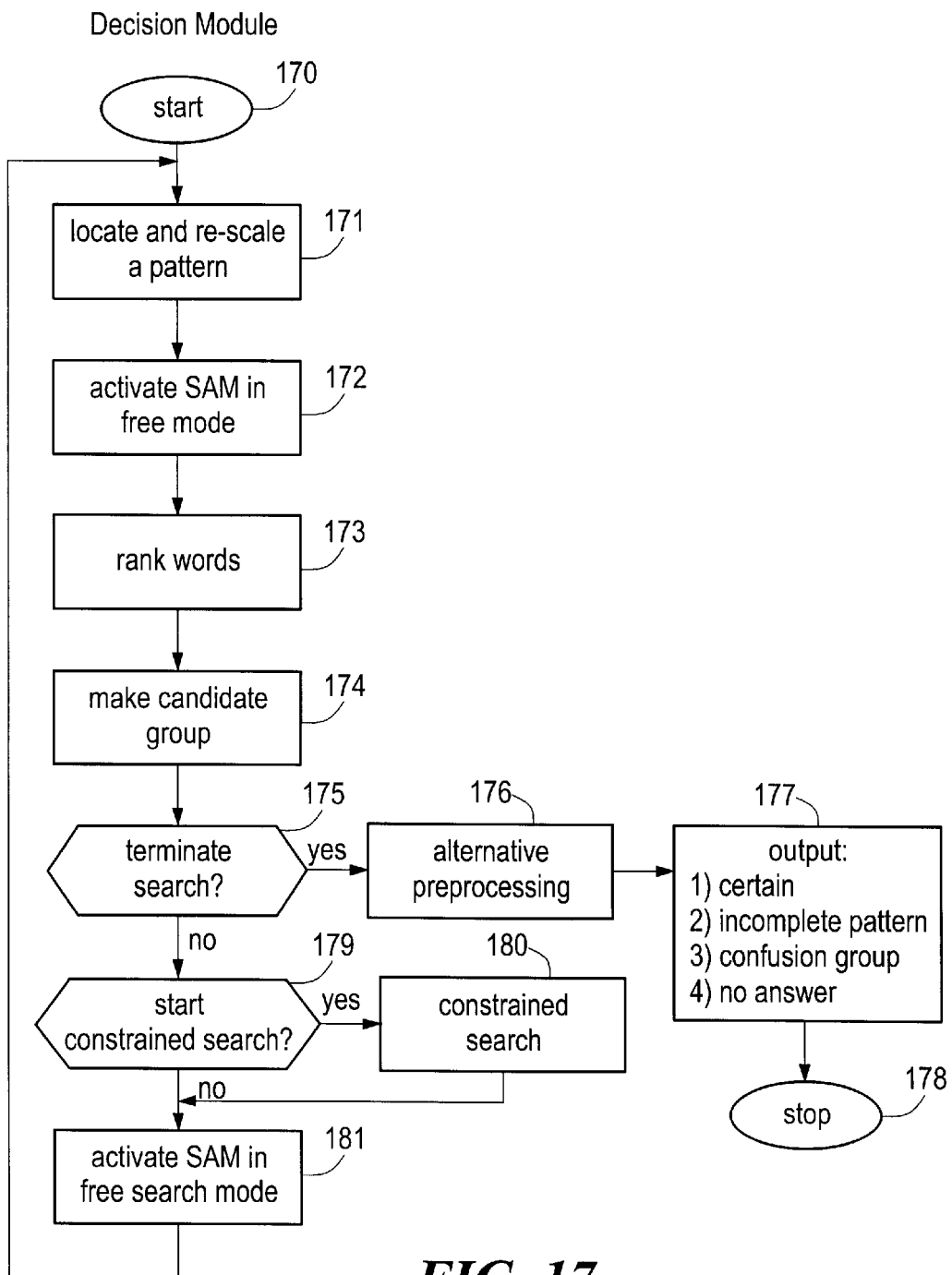
FIG. 17 is a flow diagram depicting the operation of the Decision Module.

Decision Module In previous sections we focused on the binding problem and described in more detail processing of a single word unit. In this section we will take a step back, and present a bigger picture—an overview of the recognition process of the system. We will concentrate on interaction among different modules and explain how processing of the modules is controlled, as illustrated in FIG. 17 beginning with step 170.

Figure 20:
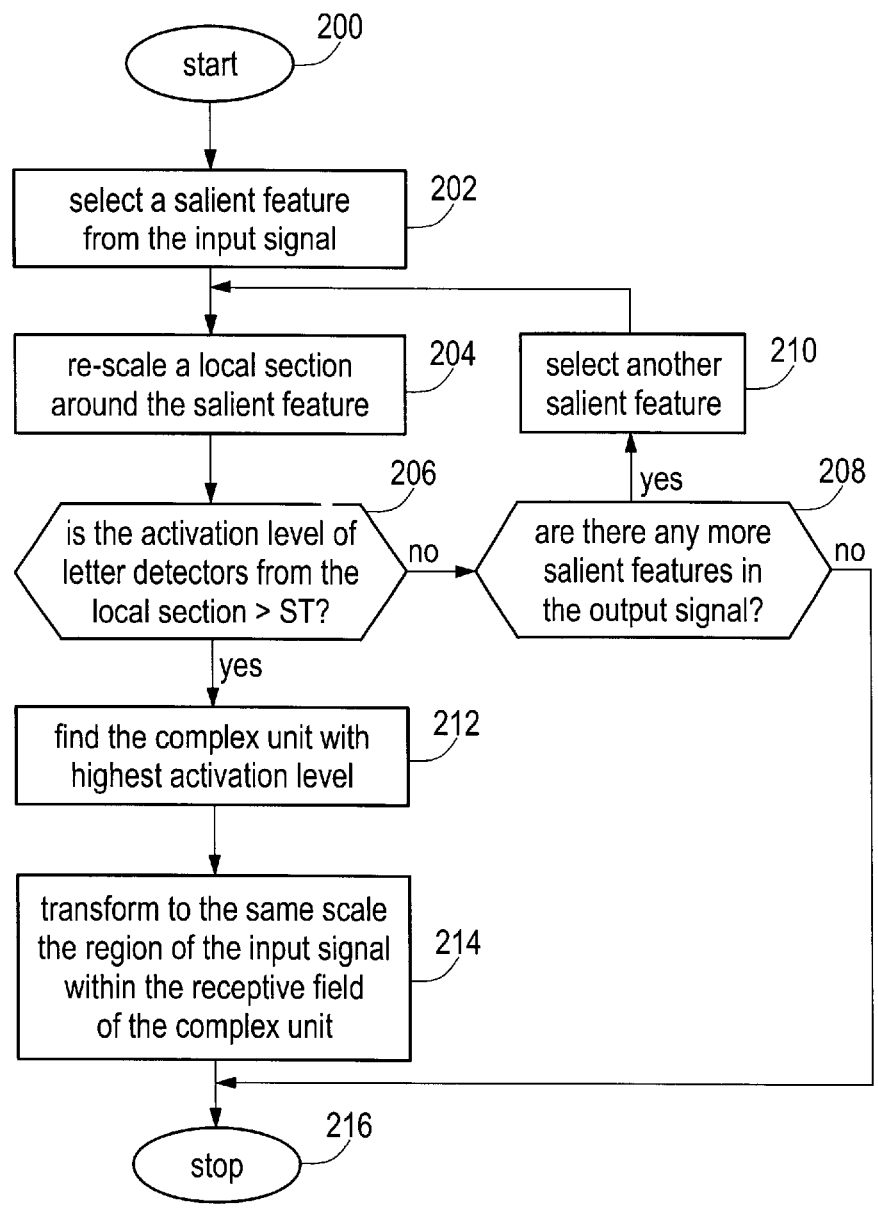
FIG. 20 is a flow diagram of steps performed to re-scale an input pattern.

With regard to locating and re-scaling the pattern at step 171, an illustrative set of steps is shown in FIG. 20. Beginning at step 200, the first step of the analysis of a visual scene is to locate the region of interest—the input pattern—within the input signal. It is often the case that different regions of the input signal have to be re-scaled by different amounts. For example, in a vehicle recognition application of the disclosed system, a camera mounted along the road produces an image containing several vehicles. Since the apparent sizes of individual vehicles depend on how far they are from the camera, each local region of the input signal (containing a vehicle) has to be separately re-scaled. An example is described below illustrating how the disclosed system finds the location and the size of a region or regions that are to be re-scaled.

It should further be noted that change of scale influences recognition in two ways: 1) it changes the size of the letters and therefore the activation levels of letter detectors, and 2) it changes the distance among the letters and therefore the activation levels of complex units.

The pattern, that is to be recognized as a word from a dictionary, is always a subset of the input signal, and its relation to the input signal can be characterized in one of the following three ways:

a) The pattern is completely within the input signal.

b) The pattern is partially within the input signal.

c) The pattern is not present in the input signal.

We will consider each possibility in turn.

a) The pattern is completely within the input signal. Recall that the detection units are trained to recognize letters of a certain and fixed size. Therefore, although the pattern might be present within the input signal, if it contains letters that are much smaller or much larger than the size of the letters the detection units are trained on, the detection units will not detect them. One possibility in choosing the optimal scale for the input signal is to resize the whole input signal. However, that solution is often prohibitively expensive in terms of computational complexity. In the disclosed system, the system finds an optimal scale by resizing local areas. The decision module chooses points, from the input signal, and re-scales the local neighborhoods (sections of the input signal) around chosen points. The points are chosen based on salient properties of the input signal, selected at step 202 of FIG. 20, or, if there are no salient features within the input signal the points are chosen randomly. For example, the salient properties can be the presence of strong edges somewhere in the image, or detection of motion, etc. Once a point, and its local neighborhood, is selected, the decision module selects the scale to which the section of the input signal is to be transformed. Resizing of the section of the input signal at step 204 can be done in many different ways. For example, if the input signal is not fixed and is obtained from a camera, then the decision module can zoom the camera in or out while centered on the point of interest. If the input signal is of a fixed size, then the change of the size of the section can be done through the preprocessor. Excluding some of the elements of the section of the input signal would effectively reduce the size of the section, while replacing every element by two elements, with the same value, would effectively increase the size of the section.

The scale to which the local section is transformed is chosen randomly, and in large steps. For instance, the local section can be re-scaled by an order of magnitude each step, with respect to its initial size. Once the transformed section of the input signal succeeds in activating at least one detection unit above a predetermined threshold value, the change of scale is continued in finer steps. The scale is always changed in the direction that increases the activation level of one or more detection units. Once the activation levels of letter detectors within a local section are greater than some Scale Threshold (ST) value at step 206, the decision module tries to exactly determine the size of the region that is to be re-scaled. The first step consists of finding the complex unit with the highest activation level at step 212. The size of the receptive field of this complex unit becomes the size of the region that is re-scaled at step 214. The re-scaling is done in such a way as to maximally activate the complex unit. Then the standard procedure of discovering the active letters is applied. The receptive field of the word unit with the highest activation level determines the final size of the region that is to be re-scaled. It is important to notice that all the sections within the region defined by the receptive field of the maximally activated word unit are transformed to the same scale at step 214.

This completes the first stage of re-scaling of the pattern. The next, finer, re-scaling procedure is part of the re-preprocessing.

b) The pattern is partially within the input signal. In this case, the procedure for locating and re-scaling the pattern is identical to case a) above. The decision module can detect that the pattern is partially present within the input signal only at the recognition level. In that case, if only a portion of the pattern is present, the decision module outputs an "incomplete pattern" message signaling that the pattern is partially present. In addition, the decision module outputs the direction and amount that the input signal (or the binding network) should be shifted in order to completely cover the pattern. For example, if the decision module has access to an input device, such as a camera, and the capability to alter the camera's direction, it would point the camera along the specified direction so that the object to be recognized becomes completely within the camera's view. The direction modification and amount of shifting of the input signal are easily calculated from the detection matrix. The fact that the pattern is partially present means that some of the complex units and simple units that belong to the word unit that represents the pattern are activated while the activation levels of some other complex units and simple units that belong to the same word unit are very low or zero. The input signal is shifted in such a way, so that the receptive fields of the central units that haven't been activated are completely within the input signal. The receptive field of the simple unit translates into the receptive fields of the detection units it contains, and therefore it can be directly related to the pattern.

c) The pattern is not present in the input signal. If, upon completion of the procedure described in case a), the outputs of the detection units are still below some predefined threshold value, the decision module signals that the pattern is not present within the input signal.

The overall control of system processing is now described. During the recognition process, the outputs of all the word units are supplied to the decision module, which ranks them according to their activation values at step 173, as shown in FIG. 17. Every word unit represents one word from a dictionary, and the activation value of the word unit is related to the probability that the input pattern represents that dictionary word. Based on the activation value of the top ranked word unit, the disclosed system selects a set of word units called the candidate group at step 174. If we denote the activation level of the n-th word unit as $e^n$, the top ranked word as $n^*$, and its activation level as $a^{n^*}$, and the candidate threshold as CT, then all the word units, whose activation levels satisfy the inequality:

$$a^{n^*}-CT \leq e^n \leq a^{n^*}, \tag{7}$$

comprise the candidate group, where $1 \leq n \leq N$, and N is the number of dictionary words. The candidate threshold can be, for instance, set to 50% of the activation level of the top ranked word.

Once the pattern has been located and re-scaled, the Decision Module (FIG. 17) performs the following functions: 1) selection of the target letter, 2) termination of the identification and classification procedure which we call the "search" as a result of the determination at step 175, 3) selection between free (step 181) or constrained (step 180) search mode at step 179, and 4) initialization of the alternative preprocessing at step 176.

1) Target selection. After the pattern is presented to the system, the first step in the recognition process is to select the target letter. The decision module activates the selective attention module at step 172, which in turn selects as the target letter the element with the highest value from its input.

2) Search termination. The search terminates at step 175 if all the words from the candidate group have undergone the full constrained search.

A word unit belongs to the confusion group if its activation level, $e^n$, satisfies the inequality:

$$a^{n^*}-DT \leq e^n, \tag{8}$$

where DT denotes difference threshold, and $DT \leq CT$. This means that every recognizable word, whose activation value is too close to the top ranked word, can be confused with the top ranked word as the correct word.

The re-preprocessing can be started if the difference between the first and second ranked word is smaller than the preprocessing threshold. If the difference between the first and second ranked word is larger than the preprocessing threshold the re-preprocessing is skipped.

The output of the system is based on the following considerations:

i) If the activation level of the highest ranking word unit from the dictionary is a) above that unit's threshold and b) the number of elements in the confusion group is zero, then the single word unit with the highest activation level is considered to be the word representing the pattern. The system's output is set to CERTAIN at step 177.

ii) If the activation level of the highest ranking word unit from the dictionary is a) above that unit's threshold and b) the number of elements in the confusion group is greater than zero, then the pattern is represented with all the words from the confusion group. The system's output is set to CONFUSION GROUP at step 177.

iii) If the activation level of the highest ranking word unit from the dictionary is below that unit's threshold then the system cannot identify the pattern as any of the words from the dictionary. The system's response is set to NO ANSWER at step 177.

3) Mode selection. The word unit is called fully activated if all of its simple units have been activated. All the words of the candidate group that are not fully activated are called target words, since they are the potential words on which the system can perform the constrained search at step 180.

As long as the target letter is not in conflict with other active letters of the top ranked word, the system performs the free search.

The constrained search is initiated at step 180 on the highest ranked word if either of the following two cases are detected at step 179:

a) if the target letter is in conflict with one or more active letters.

b) if the detection activation of the target letter is below the detection threshold. The constrained and free mode search are described in more detail below.

4) Initializing re-preprocessing. The re-preprocessing is done on certain sections of the pattern. If there is at least one complex unit, of any word unit from the candidate group, with activation level below preprocessing threshold, the re-preprocessing module is activated.

Selective Attention Module

Figure 18:
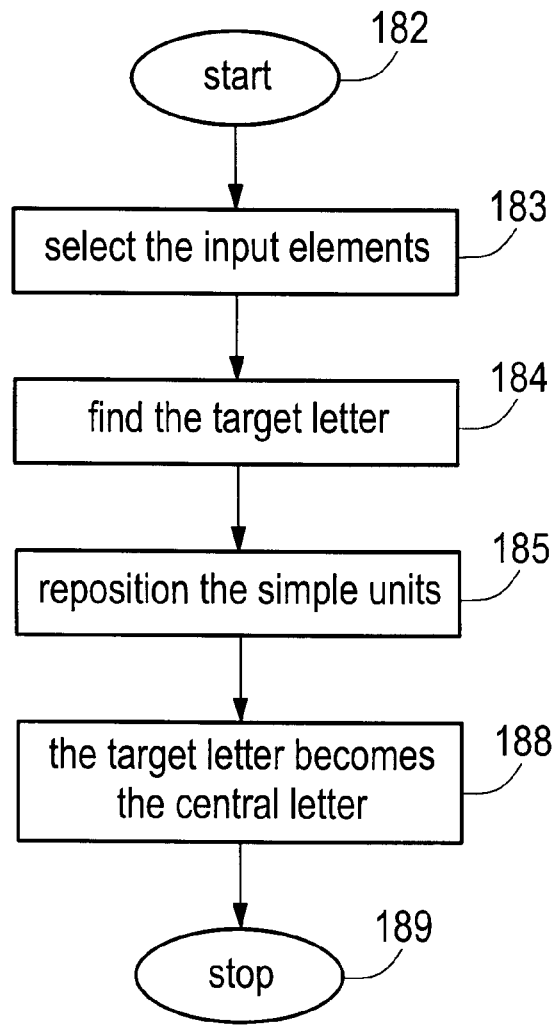
FIG. 18 is a flow diagram depicting the Selective Attention Module.

As illustrated in the steps shown in FIG. 18 beginning at step 182, the Selective Attention Module (SAM) finds the maximum among its input elements, as selected at step 183. The maximum element is called the target letter, and is selected at step 184. The SAM then shifts the binding network at step 185 relative to the detection matrix so that the central units are positioned over the target letter.

Depending on its input, the SAM can operate in free mode, free search mode, or constrained search mode, as follows:

1) The free mode is used in the beginning of the recognition process when the selective attention module chooses one element of the detection matrix with the highest value as the target letter. The input consists of all the elements of the detection matrix. That means that the feedback information is not included, since the inputs to the detection units are coming only from the pattern and not from the higher levels of the network.

2) If the input to the SAM is the collection of all the outputs of the simple units, we say that the SAM is operating in the free search mode. The activation of every simple unit is the product of the detection activation, d, (the output of the detection unit) and the expectation, g, of finding the letter at its location. Since the input to the selective attention module consists of the activation levels of all the simple units, the system is not searching for a letter of a particular word.

3) If the input to the SAM is the collection of all the simple units of a given word unit, we say that the SAM is operating in the constrained search mode.

The processing of the selective attention module reflects the high dependence of the disclosed system on the contextual or feedback information. Instead of doing extensive searching for all possible letters at all possible locations, the system looks for certain letters (of a particular dictionary word) at certain locations.

Constrained Search Mode

In constrained search mode, one word from a dictionary is selected as the active word (usually this is the word with the highest activation, but in constrained search mode any word can be chosen to be the active word). The constrained search is performed until the word is "fully activated", meaning all the complex units that represent the word unit are activated. That is equivalent to segmenting a pattern into active letters. The inputs to the selective attention module are now constrained to come only from the simple units within the active word. The influence of the feedback is used to the fullest extent. The processing of the system in this mode consists of actively looking only for the letters of the active word unit, at the regions where the system expects to see them. This mode can also be called a "biased search mode", or considered to be the fitting of a dictionary word into the pattern.

Figure 19:
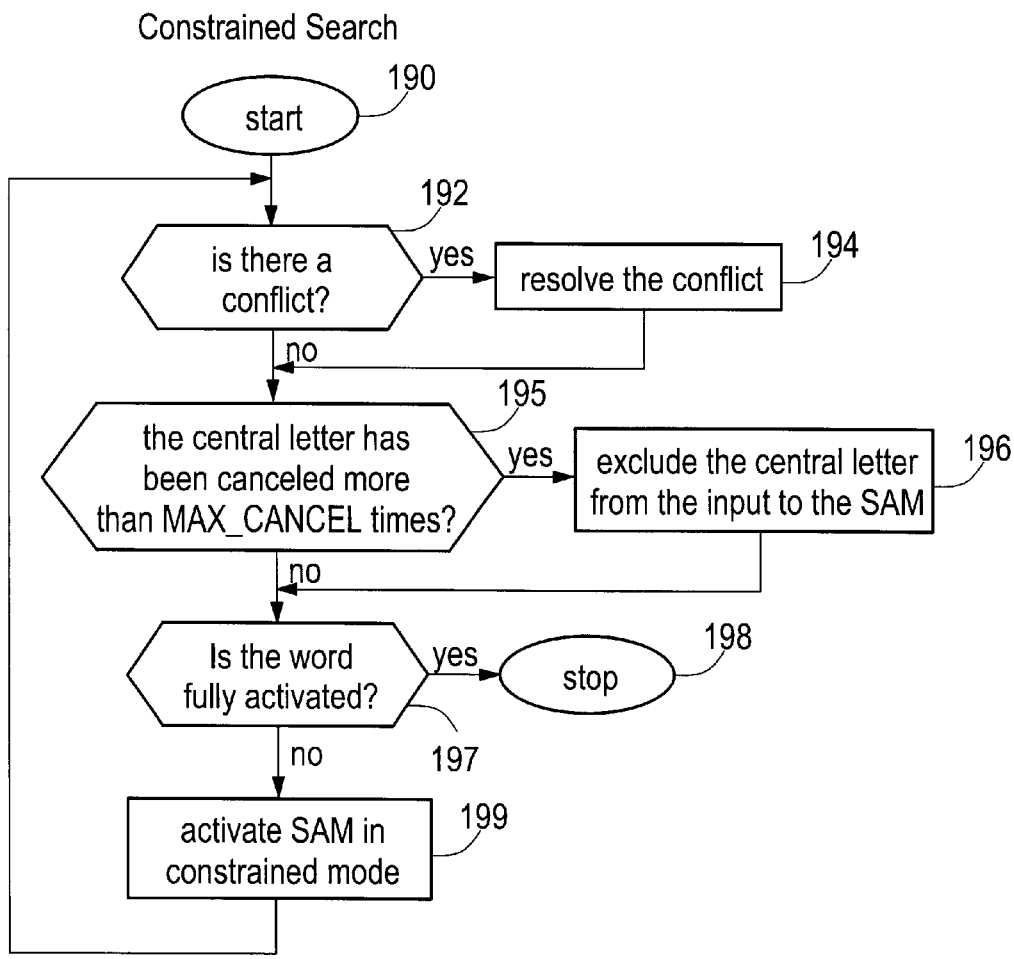
FIG. 19 is a flow diagram depicting the Constrained Search Mode algorithm.

The first step in constrained search mode, as shown in FIG. 19 beginning with step 190, is to determine if the central letter is in conflict with one or more active letters at step 192. If there is a conflict, the system switches to "resolve conflict mode" at step 194. Otherwise, if the central letter is not in conflict with any other active letter, the central letter is activated, and the selective attention module selects the next target letter.

If the central letter has been canceled in the resolve conflict mode, the system checks if it has been canceled more than MAX_CANCEL times at step 195. If that is the case, at step 196 the central letter is excluded from the input to the selective attention module, so that the next time it can not be chosen. If the input to the selective attention module becomes zero, the system terminates the constrained search.

If the central letter has not been canceled in the resolve conflict mode, the selective attention module is activated in the constrained search mode, which means that the input to the selective attention module is constrained to the simple units of the active word. The output of the selective attention module is the next target letter which, once the network is shifted, becomes the central letter.

If the word has not been fully activated, then at step 199 the selective attention module picks another target feature from the input that has been supplied to it, and activates the SAM in constrained mode. The constrained search mode is terminated at step 198 once the word is fully activated.

Re-Preprocessing

The preprocessor consists of M identical preprocessing units arranged over the input pattern at different locations. The preprocessing units, in general, have overlapping input fields. The output of each preprocessing unit is one or more features representing the section of the input signal over which the preprocessing unit is located. Each preprocessing unit can be controlled by a set of parameters. Usually, one parameter controls one feature, but sometimes one feature can be controlled by more than one parameter. For example, a preprocessing unit can have as input a section of the image (the pixel values), and output the number of edges of different orientations and sizes within that image section. Accordingly, one feature can represent the presence of at least one, or the total number of horizontal edges of a certain size. Whenever a horizontal edge detector is activated above some detection threshold value, it fires. Since the detection threshold value cannot optimally be fixed in advance for all images, it becomes a parameter that can be changed by higher level units.

It is important to note that changing the parameters of the preprocessor does not require retraining of the detection units. Alternatively, the disclosed system may select a completely different set of preprocessor features—effectively a new preprocessor. In this case, the detection units may have to be trained separately using the set of features for the new preprocessor.

Re-preprocessing is done on every word unit from the candidate group containing at least one complex unit with an activation value below the preprocessing threshold. It is started on the word unit having the highest activation level from the candidate group, and then the system moves on to the word unit with the next highest activation value, and so on until all the words from the candidate group are re-preprocessed.

Given a particular word unit, associated with the pattern on which re-preprocessing is to be performed, the first step is to find all the complex units that have activation values above a predetermined preprocessing threshold. The central letters of these units become fixed letters. Other active letters become the non-fixed letters, and are subject to change. Re-preprocessing is applied on segments of the pattern between the non-consecutive fixed letters that contain only non-fixed letters. These segments are referred to as re-preprocessing sections. Every re-preprocessing section can be characterized by its activation level, which is the sum of the values of the complex units whose central letters are located within the section. The section having the lowest activation value is processed first.

Re-preprocessing is applied to the chosen section $S_j$, using the new value of the preprocessing parameter, or a new preprocessor. This section is now treated as a "word" where the letters of the word in this case are the letters that belong to the section. The detection matrix is now composed of the sum of a) part of the "old" detection matrix that represents the given section, and b) the detection matrix obtained with the new value of the preprocessing parameter or new preprocessor on the given section that is being considered for re-preprocessing. The constrained search algorithm is then applied to the new detection matrix. For example, let us assume the re-preprocessing is applied to the word "together", and that the complex units with central letters "e" and "t" have lower activation values than are required by a predetermined preprocessing threshold. The re-preprocessing section is the segment of the pattern between the letters "g" and "h". The new value of the preprocessing parameter or the new preprocessor is chosen. Let us assume that the re-preprocessing is done by changing the value of a preprocessor parameter, and that the new parameter value makes the detection threshold for horizontal and vertical edge detection lower. This would help to detect the letter "t". Re-preprocessing with the new value of the detection threshold is applied to the section of the pattern, and an attempt is then made to detect missing, or not clearly identified letters "e" and "t".

After completion of the constrained search algorithm on the chosen section of the pattern, a new word value is calculated. If the new word value is higher than the old word value (the word value calculated prior to re-preprocessing), an attempt is made to find complex units among those whose central letters are located within the reprocessed section, with values above the preprocessing threshold. Among such complex units that are found, the letters corresponding to their central letters become fixed letters, and the initial re-preprocessing section is then divided into smaller sections between these new fixed letters. If no such complex units are found, a new value for the re-preprocessing parameter is supplied to the preprocessor and the re-preprocessing procedure is continued.

For instance, considering the previous example, let us assume that a complex unit with central letter "t", as a result of applied re-preprocessing, is identified with confidence above the preprocessing threshold. Then, the original re-preprocessing section, the segment of the pattern between the letters "g" and "h", is now reduced to the smaller section between the letters "g" and "t".

Re-preprocessing of the selected section terminates when either a) all the complex units from the section attain values above the preprocessing threshold value, or b) all the parameters for re-preprocessing or new preprocessors are tried. After the re-preprocessing of a section having a low activation is completed, the section with the next lowest activation level is chosen, and the procedure is repeated until all sections are potentially re-preprocessed.

As previously discussed with respect to the decision module, finer levels of re-scaling of the pattern can be done through the use of the preprocessor. In many applications, the input pattern can be normalized or scaled, based on a value of a normalizing parameter calculated during the preprocessing stage. However, at that stage, prior to recognition of the pattern, it is often impossible to correctly determine such a normalizing parameter. Therefore, when more information, needed for a more optimal calculation of the normalizing parameter is available, the parameter's value can be recalculated or updated. If the activation value of a related word unit is below some predefined value, one option for increasing the recognition confidence is to try to change the normalizing parameter. The system changes its value in the direction that produces a higher recognition value. The re-scaling procedure is terminated when the change in either direction leads to a lower activation value of the word unit.

Setting the Weights of the Simple Units

In an illustrative embodiment, the detection units have been trained so that they can detect letters regardless of their position within the input pattern. The output of the k-th detection unit, which is selective to the letter of the k-th class, we will denote by $d^k$, where K is the number of possible letter classes. For example, in handwriting recognition application, where the detection units are selective to letters from English alphabet, the number K is 26, k=1, 2, . . . , 26. Below are described three different methods for calculating the weights of the simple units.

1) The training set consists of labeled pairs of letters. Every word that contains more than two letters is therefore segmented into pairs of letters, consisting of nearest neighbor letters. For instance, the word "again" may be segmented into sections representing letters "ag", "ga", "ai" and "in". The training input signal, a letter pair, is presented to the detection unit network, resulting in excitation of some detection units. The detection unit with highest activation value, and from the row of the detection matrix that is selective to a first letter is selected as the detection unit representing the central letter. Then, the detection unit having the highest activation value, and from the row of the detection matrix that is selective to a second letter is selected as the detection unit representing the second letter of the input signal. Let us denote the class of the first letter as l, the class of the second letter as k, and the distance between their locations, within the detection matrix, as $\vec{x}$. Then, $$h_{\vec{x}}^{lk},$$

that is originally set to zero, is updated as $$h_{\vec{x}}^{lk} = h_{\vec{x}}^{lk} + 1, \qquad (9)$$

We will denote by $N_{lk}$ the number of times the input signal representing the pair of letters l and k has been presented to the network. After all the training samples have been presented to the network, the final value for the weight $$g_{\vec{x}}^{lk}$$

is given as:

$$g_{\vec{x}}^{lk} = \frac{h_{\vec{x}}^{lk}}{N_{lk}}. \qquad (10)$$

The number $$g_{\vec{x}}^{lk}$$

represents the probability of finding the letter of class k at location $\vec{x}$ with respect to the location of the letter of the class l, assuming that the letters are the first neighbors. At the same time, it also represents the probability of finding the letter of class l at location $-\vec{x}$ with respect to the location of the letter of the class k, so $$g_{\vec{x}}^{lk} = g_{-\vec{x}}^{kl}.$$

Knowing the weights $g^{lk}$ that relate two neighboring letters, it is easy to find probabilities of finding the non-neighboring letters at any location, by simply propagating nearest neighbors probabilities. For example, consider the word "active", and assume that the weights between nearest letters "ac", "ct", "ti", "iv" and "ve" are given. We will describe how to calculate the probability of finding the letter "t" at some location $\vec{y}$, with respect to the location of the letter "a". The weight $$g_{\vec{x}}^{ac}$$

denotes the probability of finding the letter "c" at location $\vec{x}$, with respect to the location of the letter "a". The weight $$g_{\vec{y}}^{ct},$$

that represents the probability of finding the letter "t" at location $\vec{y}$ with respect to the location of the letter "a" is given as $$g_{\vec{y}}^{at} = \sum_{\vec{x}} g_{\vec{x}}^{ac} g_{(\vec{y}-\vec{x})}^{ct}. \qquad (11)$$

Now, knowing the weights $g^{at}$ it easy to find the probability, $g^{ai}$, for finding the letter "i" at any location, with respect to the location of the letter "a". This procedure is repeated until the probabilities of locations of all the letters of the given word are found.

It is important to notice that the previously described procedure can be applied for constructing the weights of the simple units of any word, even for words that have never been presented to the binding network. The only requirement is that the word consists of pairs of letters that have been already presented to the network.

b) The second method for constructing location estimates relies on finding width distribution for each letter from the alphabet. These distributions can be easily found from the training data. In order to find the probability that the letter of class k has the width w one has to find the number of all occurrences of the letter of this class having this particular width ($n_w^k$) and divide it by the number of all occurrences of the letter of class k regardless of its width, $n^k$. The probability that the letter of class k has the width w, $P_w^k$, can be calculated as $$p_w^k = \frac{n_w^k}{n^k}. \qquad (12)$$

The probability of finding a letter of class l at distance $\vec{x}$ from the first neighboring letter of class k can be calculated from the following equation:

$$g_{\vec{x}}^{kl} = \sum_{\substack{\vec{w}_1, \vec{w}_2 \\ \vec{w}_1 + \vec{w}_2 = \vec{x}}} p_{\vec{w}_1}^k p_{\vec{w}_2}^l. \qquad (13)$$

Knowing the weights $g^{lk}$ that relate two neighboring letters, the probability of finding the two non-neighboring letters at any distance with respect to each other can be found according to Eq.(11).

3) The third method consists of setting all the weights that belong to the same simple unit to some equal value. Using the previously described method 2) one can find the receptive field of every simple unit as the region where the location estimate values are greater than zero. Let us denote by $r^{nij}$ the size of the receptive field of the j-th simple unit of the i-th complex unit of the n-th dictionary word. Then the location estimate for finding the j-th letter of the n-th dictionary word at location $\vec{x}$ with respect to the location of the i-th letter of the n-th dictionary word is given as:

$$g_{\vec{x}}^{nij} = \frac{1}{r^{nij}}, \qquad (14)$$

where the location $\vec{x}$ is restricted to be within the j-th simple unit's receptive field.

While the illustrative embodiments have been described in connection with handwriting recognition, the disclosed system may be applied to recognition systems in general, including a systems for face or vehicle recognition.

Those skilled in the art should readily appreciate that the programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem. In addition, while the invention may be embodied in computer software, the functions necessary to implement the invention may alternatively be embodied in part or in whole using hardware components such as Application Specific Integrated Circuits or other hardware, or some combination of hardware components and software.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative data structures, one skilled in the art will recognize that the system may be embodied using a variety of specific data structures. Accordingly, the invention should not be viewed as limited except by the scope and spirit of the appended claims.

What is claimed is:

1. A method for providing automated pattern recognition, comprising:

selecting a central component of an input signal;

positioning a plurality of complex units with respect to said central component of said input signal, each of said complex units associated with a plurality of simple units, one of said plurality of simple units designated as a central unit, wherein said positioning associates each of said central units with said central component of said input signal;

determining, for each of said simple units, a greatest weighted activation level responsive to at least one detection unit activation level within an associated reception field;

combining, for each of said complex units, said greatest weighted activation levels of each of said associated plurality of simple units, said combining resulting in a respective complex unit activation level for each of said complex units;

selecting one of said complex units associated with a greatest one of said complex unit activation levels;

recording an object feature associated with said central unit of said selected one of said complex units;

selecting, responsive to a receptive field of one of said simple units associated with said selected one of said complex units other than said central unit, a new central component of said input signal;

repositioning said plurality of complex units with respect to said new central component of said input signal, wherein said repositioning associates each of said central units with said new central component of said input signal; and providing a recognition indication when a set of recorded object features comprises a set of object features associated with an object to be recognized.

2. The method of claim 1, further comprising:

determining at least one contextual expectation with regard to said input signal; and wherein said selecting said new central component of said input signal is further responsive to said at least one contextual expectation with regard to said input signal.

3. The method of claim 2, wherein said determining said at least one contextual expectation comprises determining a temporal expectation with regard to said input signal.

4. The method of claim 2, wherein said determining said at least one contextual expectation comprises determining a locational expectation with regard to said input signal.

5. The method of claim 2, wherein said determining said at least one contextual expectation comprises determining a contextual expectation with respect to at least one component of a recognizable object.

6. The method of claim 5, wherein said input signal represents handwriting, wherein said recognizable object comprises at least one word, and wherein said at least one contextual expectation with respect to said at least one component of said recognizable object comprises at least one expected letter within said at least one word.

7. The method of claim 1, wherein said input signal represents audio information.

8. The method of claim 1, wherein said input signal represents video information.

9. The method of claim 1, further comprising:

determining at least one contextual expectation with regard to said input signal; and wherein said determining said greatest weighted activation level is further responsive to said at least one contextual expectation with regard to said input signal.

10. The method of claim 9, wherein said determining said at least one contextual expectation comprises determining a temporal expectation with regard to said input signal.

11. The method of claim 9, wherein said determining said at least one contextual expectation comprises determining a locational expectation with regard to said input signal.

12. The method of claim 9, wherein said determining said at least one contextual expectation comprises determining a contextual expectation with respect to at least one component of a recognizable object.

13. The method of claim 12, wherein said input signal represents handwriting, wherein said recognizable object comprises at least one word, and wherein said at least one contextual expectation with respect to said at least one component of said recognizable object comprises at least one expected letter within said at least one word.

* * * * *